(12) United States Patent
Yamauchi

(10) Patent No.: US 7,486,874 B2
(45) Date of Patent: Feb. 3, 2009

(54) IMAGE REPRODUCTION APPARATUS

(75) Inventor: Kenichiro Yamauchi, Nagaokakyo (JP)

(73) Assignee: Panasonic Corporation, Osaka (JP)

( * ) Notice: Subject to any disclaimer, the term of this patent is extended or adjusted under 35 U.S.C. 154(b) by 1041 days.

(21) Appl. No.: 10/809,379

(22) Filed: Mar. 26, 2004

(65) Prior Publication Data
US 2004/0233938 A1 Nov. 25, 2004

(30) Foreign Application Priority Data
Mar. 27, 2003 (JP) ............................ 2003-088786

(51) Int. Cl.
H04N 5/91 (2006.01)
H04N 7/00 (2006.01)
(52) U.S. Cl. .......................................... 386/68; 386/98
(58) Field of Classification Search .................. 386/68, 386/111, 81, 46, 95
See application file for complete search history.

(56) References Cited

U.S. PATENT DOCUMENTS 5,867,625 A * 2/1999 McLaren ...................... 386/68
5,966,387 A 10/1999 Cloutier
6,169,843 B1 * 1/2001 Lenihan et al. ................ 386/46
6,680,921 B1 * 1/2004 Svanbro et al. ............. 370/324
2001/0041060 A1 * 11/2001 Ohara et al. ................. 386/111
2003/0039467 A1 2/2003 Adolph et al.

FOREIGN PATENT DOCUMENTS

| EP | 1 286 538 | 2/2003 |
| JP | 11-41193 | 2/1999 |
| JP | 2002-185901 | 6/2002 |

* cited by examiner

Primary Examiner—Thai Tran
Assistant Examiner—Tat Chi Chio
(74) Attorney, Agent, or Firm—Wenderoth, Lind & Ponack, L.L.P.

(57) ABSTRACT

An image reproduction apparatus that selects arbitrary video/audio data among a plurality of MPEG transport streams which have been recorded in a storage medium at different times, and re-multiplexes the selected video and audio data into one MPEG transport stream to be reproduced. When a MPEG transport stream is recorded in the storage medium, a reference clock is generated from Program_clock_reference in the stream, and then the MPEG transport stream is recorded with the generated reference clock attached thereto as an Arrived Time Stamp. At the start of reproduction, a common PCR is generated on the basis of the ATS value to be used as a video/audio PCR. Further, as for PTS and DTS, the difference value in the ATS of packets having PTS and DTS in the same video/audio is calculated, and the video or audio is outputted so as not to vary the difference value.

21 Claims, 18 Drawing Sheets

Fig.19

| | bit length |
|---|---|
| Packet_start_code_prefix | 24 |
| Stream_id | 8 |
| 10 | 2 |
| PES_scrambling_control | 2 |
| PES_priority | 1 |
| Data_alignment_indicator | 1 |
| Copyright | 1 |
| Original_or_copy | 1 |
| PTS_DTS_flags | 2 |
| ESCR_flag | 1 |
| ES_rate_flag | 1 |
| DSM_trick_mode_flag | 1 |
| Additional_copy_info_flag | 1 |
| PES_CRC_flag | 1 |
| PES_extension_flag | 1 |
| PES_header_data_length | 8 |

| | |
|---|---|
| Optional_field_data | |
| stuffing =0xFF··· | |

| | |
|---|---|
| PES_packet_data_byte | |

IMAGE REPRODUCTION APPARATUS

BACKGROUND OF THE INVENTION

1. Field of the Invention

The present invention relates to image reproduction apparatuses and, more particularly, to image reproduction apparatuses that (i) extract arbitrary video/audio data from plural MPEG transport streams that are stored in an apparatus for storing and reproducing digital broadcast data which are composed of MPEG transport streams, and (ii) reorganize a new MPEG transport stream.

2. Description of the Related Art

In recent years, as BS digital broadcasting, terrestrial digital broadcasting, and the like have become widespread, equipment for storing digital broadcast data has become widely available. The digital broadcast data is transmitted in a MPEG transport stream that is defined by ISO/IEC 13818-1. FIG. 17 illustrates a structure of the MPEG transport stream.

The MPEG transport stream is composed of plural packets, each comprising 188 bytes. The 188-byte MPEG transport stream packet is divided into a TS_header and a Payload area.

A packet identifier (PID) in FIG. 17 has a length of 13 bits and is included in TS_header. The PID indicates the type of the packet. The type of the packet (video, audio, or PSI) is decided with reference to PID. In the payload area of a packet having a video PID, video streams are stored.

In addition, adaptation_field_control indicates a structure of data that follow continuity_counter.

In the case where 2 bits of adaptation_field_control are 2'b11, continuity_counter is followed by adaptation_field_length, adaptation_field (when adaptation_field_length=0, there is no adaptation_field), and Payload. In the Payload area, PSI (program specific information) or PES (Packetized Elementary Stream) data are stored.

In the case where 2 bits of adaptation_field_control are 2'b10, continuity_counter is followed by adaptation_field_length and adaptation_field. There is no Payload.

In the case where 2 bits of adaptation_field_counter are 2'b01, continuity_counter is followed by Payload.

The structure of adaptation_field is shown in FIG. 18.

The adaptation_field comprise adaptation_field_length (8-bit data) that indicates the length of adaptation_field, which is followed by flags of 8 bits indicating types of data included in the adaptation_field, which is further followed by Optional_field_data.

Among these flags, the 4th bit from the highest order flag is PCR_flag. When PCR_flag is 1, PCR (Program_clock_reference) is included in Optional_field_data. The PCR indicates the time when the last bit in a packet of the MPEG transport Stream including this PCR would reach a MPEG decoding apparatus. The PCR is constituted by Program_clock_reference_extension (9 bits) and Program_clock_reference_base. Program_clock_reference_extension indicates a value of a counter that counts from 0 to 299 at 27 MHz. When the counter value exceeds 299, the counter returns to 0. Program_clock_reference_base is incremented by 1 at a time when Program_clock_reference_extension exceeds 299. The PCR is used to generate the frequency of a reference clock (hereinafter, referred to as STC) for the apparatus that decodes the MPEG transport stream.

Further, when OPCR_flag in FIG. 18 is 1, optional_field_area includes the value of OPCR (original_program_clock_reference). OPCR is an area for duplicating the original PCR in generating another MPEG transport stream using a MPEG transport stream.

The structure of the PES data is shown in FIG. 19.

The PES data contains Packet_start_code_prefix starting from 24'h000001, which is followed by Stream_id, flag signals of 2 byte indicating the contents of data included in Optional_field_data, PES_header_data_length indicating the length of PES_header, Optional_field_data, and PES_packet_data_byte.

When PTS_DTS_flags in FIG. 19 are 2'b11, a PTS (presentation time stamp) and a DTS (decoding time stamp) are set in Optional_field_data. The PTS indicates the time when decoded videos or audio are reproduced and outputted. When STC coincides with PTS, images or sounds including this PTS are outputted. The DTS is time information for controlling decoding when the decoding time and the reproduction time are different, like in the case of I pictures or P pictures of MPEG video. The PTS and DTS each have the length of 3 bits, and are indicated in unit of 90 KHz.

When PTS_DTS_flags in FIG. 19 are 2'b10, only the PTS (presentation time stamp) is set in Optional_field_data.

In digital broadcasting, by utilizing the above-mentioned MPEG transport stream format, multiplication of plural images, sounds, and program information such as EPG can be realized. In order to identify the images, sounds and the like, the PID information is employed, and combination of images and sounds is given in the PSI information (PAT, PMT).

Further, in recent years, as the digital broadcasting that is implemented by plural video/audio channels has come into widespread use, systems for simultaneously decoding plural video/audio data have become available. An apparatus for simultaneously decoding plural video/audio data is shown in FIG. 20.

When a MPEG transport stream 6a is inputted to a PID filter 61, the PID filter 61 generates a signal 6b by extracting video/audio packets having a PID to be reproduced, and transmits the generated signal to a buffer 62 and a PCR PTS·DTS detection unit 65. The PCR PTS·DTS detection unit 65 detects PCR in the packet and generates STC. The PCR PTS·DTS detection unit 65 further detects PTS and DTS from the video/audio data. When the STC value coincides with PTS and DTS, the unit 65 transmits a PTS·DTS control signal 6e for controlling a video/audio decoding unit 63 for decoding video/audio data, while when the STC value coincides with PTS, the unit 65 transmits a PTS control signal 6f for controlling displaying of the decoded images or outputting of the decoded sounds. The video/audio decoding unit 63 reads a video/audio packet 6c from the buffer 62 with referring to the PTS·DTS control signal 6e to decode the packet 6c, and transmits decoded video/audio data 6d to a buffer 64. The video/audio data stored in the buffer 64 are transmitted as output images or sounds 6g with reference to the PTS control signal 6f, so that the images and the sounds are synchronized. A decoding apparatus shown in FIG. 20 is constituted by a plurality of the above-mentioned decoding unit.

An example of a screen image that is reproduced by the decoding apparatus of FIG. 20 is shown in FIG. 21.

A display screen image 71 is composed of plural decoded images 72 that are images generated by the decoding apparatus shown in FIG. 20, arbitrary graphics 73, and a program image 74 that shows program information. The program image 74 may be constituted by EPG (Electric Program Guide). It is possible to select whether one of sounds that are decoded by the decoding apparatus of FIG. 20 is selected, an arbitrary sound is reproduced from outside, or no sound is reproduced. By using the decoding apparatus as shown in FIG. 20, plural images can be displayed on one screen. Particularly, because of increases in the capacity of a hard disk drive or an optical disc, it has become possible to simultaneously view and listen to plural MPEG transport streams that were recorded at different times.

In order to obtain a reproduced image as shown in FIG. 21, it is necessary that arbitrary video/audio data should be extracted from among plural MPEG transport streams to form another MPEG transport stream.

In extracting arbitrary video/audio data from among plural MPEG transport streams to form another MPEG transport stream, as time information indicated by PCRs of the respective MPEG transport streams is different, when packets are re-multiplexed as they are, the time information may be changed indiscriminately, whereby it is impossible to decode these packets by the decoding apparatus.

Thus, to solve this problem, the conventional image reproduction apparatus has plural means in parallel for generating a STC from PCR information included in the respective MPEG transport streams, thereby rewriting a PCR of a stream that has been re-multiplexed on the basis of the STC counter (for example, see Japanese Patent Application No. Hei. 11-41193 (FIG. 1) and Japanese Published Patent Application No. 2002-185901 (FIG. 1)).

The conventional method is shown in FIG. 22. FIG. 22 illustrates an apparatus that extracts arbitrary video/audio data from plural MPEG transport streams 2a that are inputted, and outputs a re-multiplexed MPEG transport stream 2g.

The apparatus shown in FIG. 22 includes plural one-channel reproduction units 25.

In the one-channel reproduction unit 25, MPEG transport streams 2a are inputted to a PID filter 21. The PID filter 21 selects video or audio data of an arbitrary channel from the MPEG transport streams 2a and transmits the selected video or audio data 2b to a buffer 22, as well as selects a packet having a PCR and transmits the selected packet 2c including the PCR to a PCR detection STC generation unit 24. The PCR detection STC generation unit 24 detects the PCR value from the packet 2c including the PCR, and generates a STC so as to be in phases with PCR. A multiplexing means 26 selects video and audio data to be outputted, and tries to read MPEG transport packets that are stored in the buffer 22. At that time, a PCR rewriting unit 23 reads a selected video/audio packet 2d from the buffer 22, further reads a rewriting PCR value 2e that has been read from the PCR detection STC generation unit 24, and rewrites the PCR value in the selected packet to the rewriting PCR value 2e, thereby outputting a reproduction video/audio packet 2f to the multiplexing means 26. Here, in many cases, a STC value that is generated by the PCR detection STC generation unit 24 is employed as the rewriting PCR value 2e. Plural reproduction video/audio packets 2f that are outputted from the plural one-channel reproduction units 25 are multiplexed by the multiplexing means 26, and are outputted as a multiplexed MPEG transport stream 2g.

However, in the above-mentioned method, two problems would arise.

Initially, since different time base PCR are allocated to respective images that are reproduced by the conventional reproduction apparatus, respective images and sounds must be reproduced by the decoding apparatus using different STC, respectively. Further, when these images are simultaneously displayed on the same screen as shown in FIG. 21, the display becomes complicated because they have different STC.

Secondly, as the PCR is changed at output timing, a difference between PTS·DTS in the stream and the rewritten PCR becomes large, thereby preventing accurate decoding of the MPEG transport stream. Particularly, as the buffer 62 of FIG. 20 controls the remaining amount of the buffer using STC PTS·DTS, when the changed value of the PCR is greatly different from the original PCR, the buffer may overflow or underflow. The buffer overflow or underflow will occur more remarkably as the number of MPEG transport streams to be multiplexed is increased.

As described above, in the apparatus that extracts arbitrary video, audio, and data from among plural MPEG transport streams to be re-multiplexed and reproduced, it is necessary that the PCR should be individually changed for each video or audio to decode the video or audio data at different time bases in the decoding, thereby enabling to display images and sounds on one screen. Further, when the number of MPEG transport streams to be multiplexed is increased, the changed PCR would not coincide with PTS·DTS, resulting in overflow or underflow of the buffer in the decoding apparatus.

BRIEF SUMMARY OF THE INVENTION

The present invention has for its object to provide an image reproduction apparatus that can simultaneously view and listen to plural MPEG transport streams that were recorded at different times.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided an image reproduction apparatus including an ATS generation unit, an ATS multiplexing unit, channel reproduction units, a reproduction ATS generation unit, a reproduction timing generation unit, and a multiplexing unit, wherein a MPEG transport stream is inputted to the ATS generation unit and the ATS multiplexing unit, the ATS generation unit detects a PCR value in the input MPEG transport stream, and outputs an Arrived Time Stamp (ATS) to the ATS multiplexing unit, the ATS multiplexing unit multiplexes the Arrived Time Stamp and the input MPEG transport stream, and stores the multiplexed data in a storage medium, the channel reproduction units each include a PID filter, a buffer, a packet rewriting unit, an ATS detection unit, and a PTS·DTS detection unit, the PID filter extracts a MPEG transport stream having a PID that is to be reproduced from the storage medium, and outputs the extracted MPEG transport stream to the buffer and the PTS·DTS detection unit, the buffer outputs a MPEG transport stream to the packet rewriting unit in accordance with a control of the multiplexing unit, the packet rewriting unit rewrites a time that is indicated by an ATS counter, which is outputted from the reproduction timing generation unit, as PCR, and outputs the rewritten PCR, the ATS detection unit reads an initial value of the ATS that is multiplexed in the MPEG transport stream which is read from the storage medium, and outputs the initial value to the reproduction ATS generation unit, the PTS·DTS detection unit detects PTS and DTS in the input MPEG transport stream, and outputs the PTS and DTS values to the reproduction timing generation unit, the reproduction ATS generation unit selects one of the ATS values, corresponding to one channel, which are inputted from the ATS detection unit, and outputs a value of a counter which uses the selected ATS as the initial value, to the packet rewriting unit, the reproduction timing generation unit, and the multiplexing unit, as well as outputs a difference between the ATS initial value of the selected channel which is used as the initial value of the counter and an ATS initial value of other channel to the reproduction timing generation unit, the reproduction timing generation unit generates timing of multiplexing of the MPEG transport stream that is outputted from the channel reproduction unit, and outputs the generated timing to the multiplexing unit, and the multiplexing unit multiplexes the MPEG transport streams that are outputted from the channel reproduction unit in accordance with the multiplexing timing that is outputted from the reproduction timing generation unit, and outputs the multiplexed stream.

According to a 2nd aspect of the present invention, in the image reproduction apparatus of the 1st aspect, the reproduction timing generation unit generates a timing such that a reproduction time interval between a Presentation Time Stamp (PTS) and a Decoding Time Stamp (DTS) of an arbitrary video/audio channel, which are included in the MPEG transport stream outputted from the multiplexing unit, becomes equal to a time interval between a PTS and a DTS in a MPEG transport stream of the original images.

According to a 3rd aspect of the present invention, in the image reproduction apparatus of the 1st aspect, the packet rewriting unit further has a function of rewriting a stream, thereby controlling a buffer in a decoding apparatus.

According to a 4th aspect of the present invention, in the image reproduction apparatus of the 3rd aspect, the packet rewriting unit rewrites a stream by rewriting vbv_delay in a MPEG video stream.

According to a 5th aspect of the present invention, in the image reproduction apparatus of the 3rd aspect, the packet rewriting unit further has a function of rewriting a coding parameter of a video/audio stream, and monitors a code amount of a video/audio stream in a MPEG transport stream at the reproduction, thereby optimizing the code amount.

According to a 6th aspect of the present invention, in the image reproduction apparatus of the 1st aspect, a reproduction control signal for informing switching of video between arbitrary channels is inputted to the packet rewriting unit and the reproduction timing generation unit, and the reproduction timing generation unit generates a PTS and a DTS for correcting discontinuity in MPEG video streams resulting from the channel switching in accordance with the reproduction control signal, thereby correcting discontinuity other than in the PTS and the DTS in the MPEG video streams resulting from the channel switching.

According to a 7th aspect of the present invention, in the image reproduction apparatus of the 1st aspect, a reproduction control signal for informing switching of video between arbitrary channels is inputted to the reproduction timing generation unit, and the reproduction timing generation unit generates timing of multiplexing of MPEG transport streams for correcting discontinuity in the Arrived Time Stamp resulting from the channel switching in accordance with the reproduction control signal.

According to an 8th aspect of the present invention, in the image reproduction apparatus of the 1st aspect, a reproduction control signal for informing switching of video between arbitrary channels is inputted to the packet rewriting unit and the reproduction timing generation unit, and the reproduction timing generation unit has a function of generating a PTS and a DTS for correcting discontinuity in MPEG video streams resulting from the channel switching in accordance with the reproduction control signal, thereby correcting discontinuity other than in the PTS and the DTS in the MPEG video streams resulting from the channel switching, as well as has a function of generating timing of multiplexing of MPEG transport streams for correcting discontinuity in the Arrived Time Stamps resulting from the channel switching in accordance with the reproduction control signal.

According to a 9th aspect of the present invention, in the image reproduction apparatus of the 6th or 8th aspect, the discontinuity other than in the PTS and the DTS in the MPEG video streams resulting from the channel switching is discontinuity in Broken_link bits in the MPEG video streams.

According to a 10th aspect of the present invention, in the image reproduction apparatus of the 6th or 8th aspect, the discontinuity other than that in the PTS and the DTS in the MPEG video streams resulting from the channel switching is discontinuity in Continuity_counter bits in the MPEG transport streams.

According to an 11th aspect of the present invention, in the image reproduction apparatus of the 6th or 8th aspect, the packet rewriting unit rewrites a PID so as to prevent a change in a video/audio PID at a time when the channel switching is performed.

According to a 12th aspect of the present invention, in the image reproduction apparatus of the 6th or 8th aspect, the packet rewriting unit outputs a dummy MPEG transport stream at the channel switching during a period from when an output of a video stream that is being reproduced stops and to when reproduction of the next stream is started.

According to a 13th aspect of the present invention, in the image reproduction apparatus of the 12th aspect, the dummy MPEG transport stream comprises pictures of a low bit rate.

According to a 14th aspect of the present invention, in the image reproduction apparatus of the 12th aspect, the dummy MPEG transport stream comprises a picture that is required to decode a start picture of the next stream.

According to a 15th aspect of the present invention, in the image reproduction apparatus of the 12th aspect, when the video stream is switched by the channel switching to a stream of a different time period in the same video stream, the dummy MPEG transport stream comprises arbitrary pictures between the last picture in the video stream that is stopped by the channel switching and the first picture in the video stream that will be reproduced next.

According to a 16th aspect of the present invention, in the image reproduction apparatus of the 12th aspect, the dummy MPEG transport stream comprises a picture that is required to decode a start picture of the next stream, or when the video stream is switched by the channel switching to a stream of a different time period in the same video stream, the dummy MPEG transport stream comprises arbitrary pictures between the last picture of the video stream that is stopped by the channel switching and the first picture of the video stream that will be reproduced next.

According to a 17th aspect of the present invention, the image reproduction apparatus of the 1st aspect further includes: a trick-play control unit and a trick-play picture generation unit, the trick-play control unit transmitting a transmission band that is allocated to trick play and trick-play control information to the trick-play picture generation unit, and the trick play picture generation unit generating trick-play video/audio on the basis of outputs from the buffer using the transmission band and the control information which are transmitted from the trick-play control unit, and transmitting the generated video/audio to the packet rewriting unit.

According to an 18th aspect of the present invention, in the image reproduction apparatus of the 17th aspect, the trick-play control unit changes the transmission band that is allocated to the trick play also in a period when the trick play is being performed, and the trick-play picture generation unit generates trick-play pictures on the basis of the transmission band that is transmitted from the trick-play control unit.

According to the image reproduction apparatus of the present invention, when a MPEG transport stream is stored in an storage medium, a STC is generated from a PCR in the stream, the STC is added to the MPEG transport stream as an ATS (Arrived Time Stamp) to be stored, and when starting reproduction, the value of the readout ATS is used as a PCR at the reproduction, so that the respective STCs which are reproduced from the respective PCRs at the reproduction have the same value. Therefore, it is possible to overcome the above-described problem occurring when plural images/sounds are displayed on the same screen, that is, it is possible to display plural images/sounds on the same screen, without individually rewriting respective PCRs of video/audio and decoding the same on different time bases at the decoding.

Further, as for PTS and DTS, the difference value in ATS between packets having PTS or DTS in the same video or audio is produced so as to output the video or audio with holding the difference value. Thereby, no underflow or overflow occurs in the buffer of the decoding apparatus.

BRIEF DESCRIPTION OF THE DRAWINGS

FIG. 19 is a diagram illustrating a structure of a PES.

DETAILED DESCRIPTION OF THE INVENTION

Hereinafter, embodiments of the present invention will be described with reference to the drawings.

Embodiment 1

Figure 1:
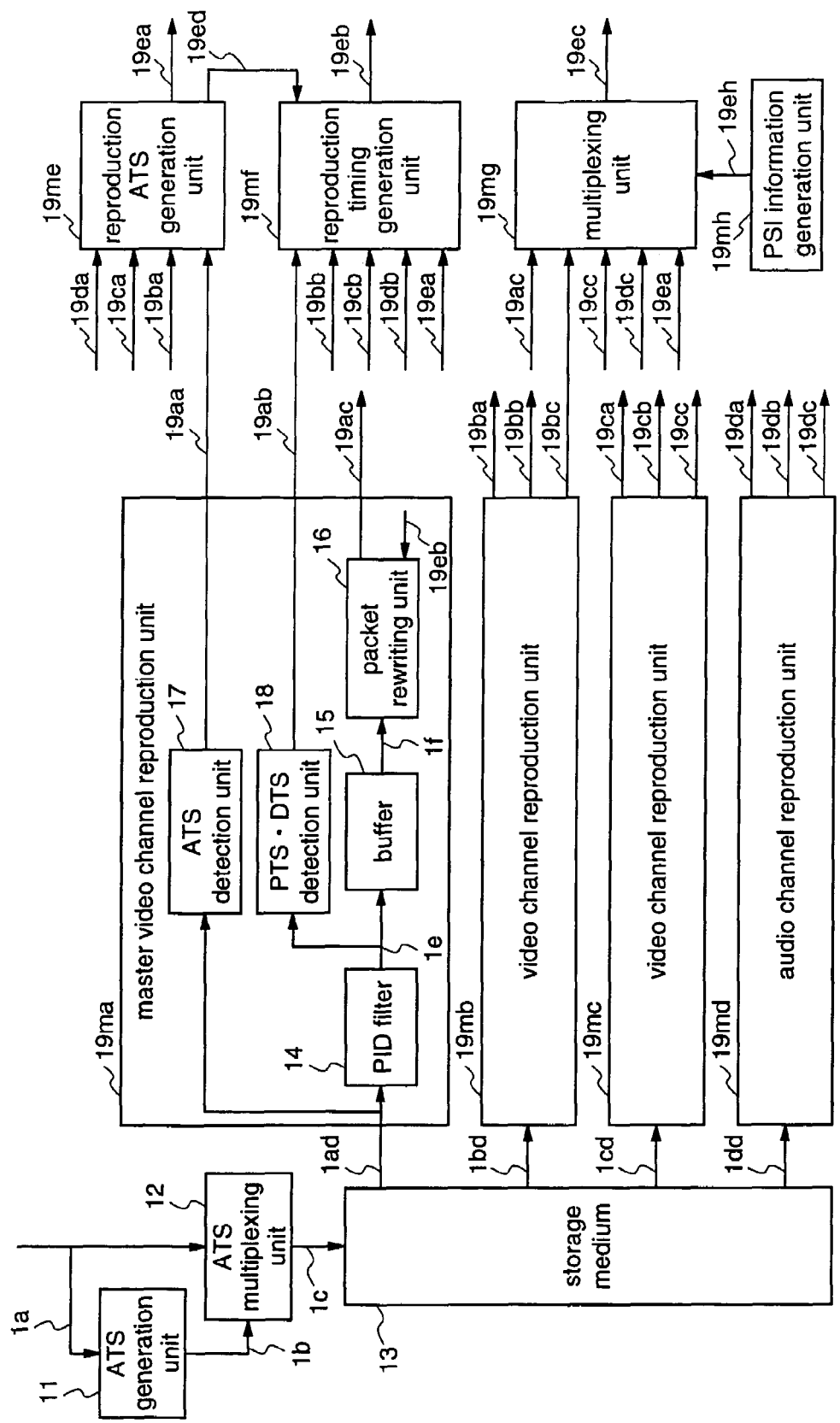
FIG. 1 is a diagram illustrating an image reproduction apparatus according to a first embodiment of the present invention.

FIG. 1 illustrates an image reproduction apparatus according to a first embodiment of the present invention.

The image reproduction apparatus as shown in FIG. 1 includes an ATS (arrived time stamp) generation unit 11, an ATS multiplexing unit 12, a storage medium 13, a master video channel reproduction unit 19ma, a video channel reproduction unit 19mb, a video channel reproduction unit 19mc, an audio channel reproduction unit 19md, a reproduction ATS generation unit 19me, a reproduction timing generation unit 19mf, a multiplexing unit 19mg, and aPSI information generation unit 19mh.

The master video channel reproduction unit 19ma includes a PID filter 14, a buffer 15, a packet rewriting unit 16, an ATS detection unit 17, and a PTS·DTS detection unit 18. The video channel reproduction unit 19mb, the video channel reproduction unit 19mc, and the audio channel reproduction unit 19md have the same structure as the master video channel reproduction unit 19ma, respectively. Further, the video channel reproduction unit 19ma is set as a master channel in this construction, but an arbitrary channel can be set as the master channel.

Next, the operation of the apparatus will be described.

An input MPEG transport stream 1a is inputted to the ATS generation unit 11 and the ATS multiplexing unit 12.

The ATS generation unit 11 reads the value of a PCR in the input MPEG transport stream 1a to generate an ATS 1b, and inputs the generated ATS 1b to the ATS multiplexing unit 12.

Figure 2:
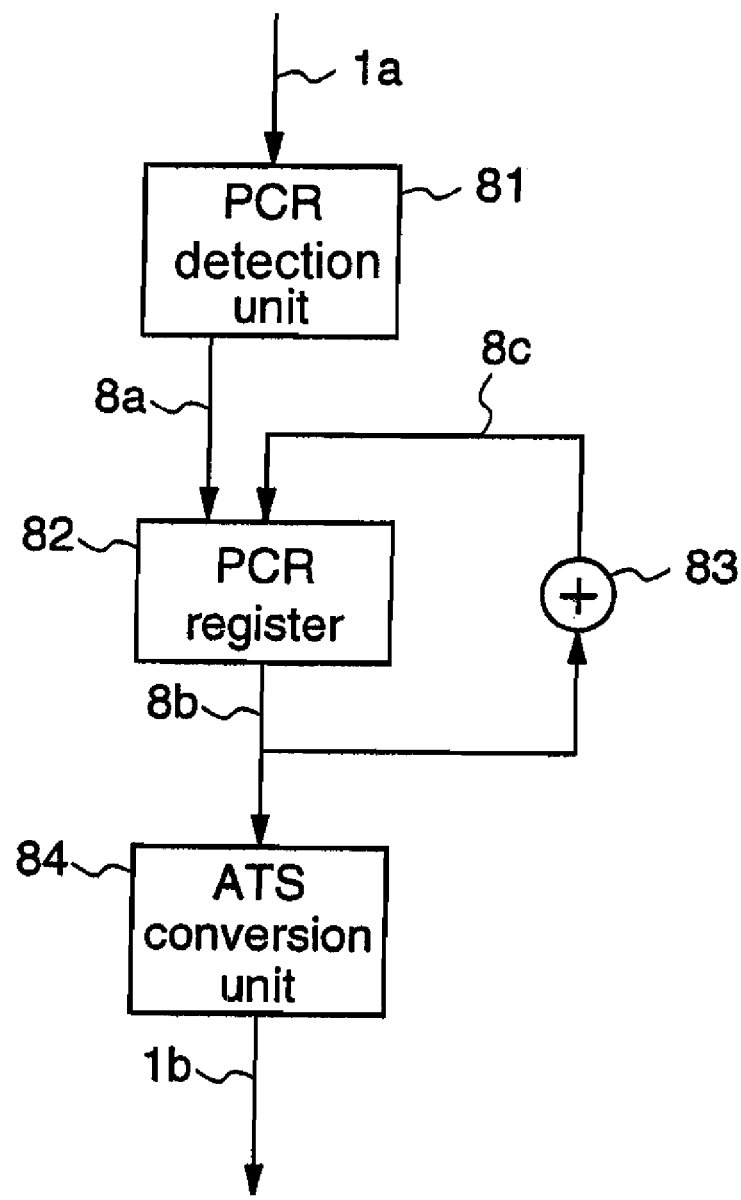
FIG. 2 is a diagram illustrating a structure of an ATS generating apparatus according to the first embodiment.

FIG. 2 shows an example of the structure of the ATS generation unit 11. A PCR detection unit 81 detects the PCR in the input MPEG transport stream 1a, and sets the PCR value 8a in a PCR register 82. A PCR counter 83 generates a value 8c that is incremented by 1 at every 27 MHz with relative to the PCR counter value 8b that is read from the PCR register 82, thereby updating the value of the PCR register 82. The PCR counter 83 is a 41-bit counter, which will be advanced by 1 at the 10th bit when counting the lower 9 bits up to 299. An ATS conversion unit 84 converts the method of counting up the lower 9 bits of the PCR counter value 8b from 0 to 299 into a method of counting the lower 9 bits from 0 to 511, and outputs lower 30 bits as an ATS value 1b.

The ATS multiplexing unit 12 multiplexes the input MPEG transport stream 1a and the ATS 1b to output a multiplexed MPEG transport stream 1c, and records the multiplexed MPEG transport stream 1c in the storage medium 13. In the storage medium 13, plural MPEG transport streams are recorded.

Figure 3:
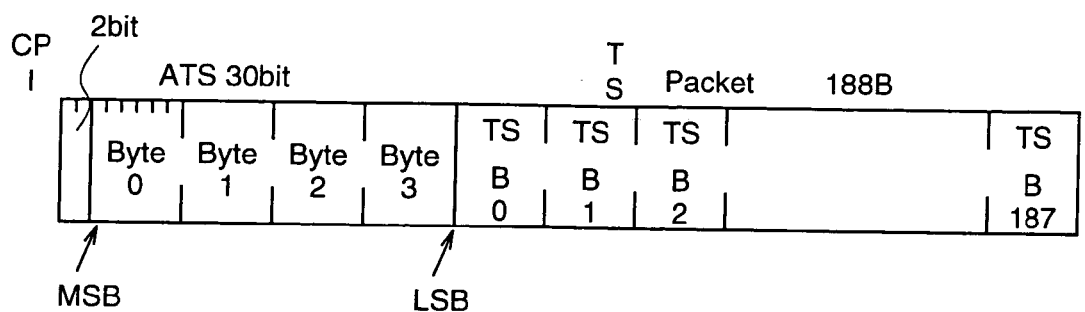
FIG. 3 is a diagram showing an example of multiplexing of an ATS and a MPEG transport stream according to the first embodiment.

FIG. 3 shows an example of the multiplexing of the ATS 1b and the MPEG transport stream 1a, which is performed by the ATS multiplexing unit 12. A signal for controlling duplication of contents, which is referred to as CPI, is set at the first 2 bits, and then 30 bits of ATS are stored from LSB. At the end, a MPEG transport stream comprising 188 bytes is stored. The AST multiplexing unit 12 performs this multiplexing processing in units of a MPEG transport stream.

The PID filter 14 in the reproduction unit associated with respective channels extracts a MPEG transport stream having a video or audio PID which is to be reproduced, from among reproduction MPEG transport streams 1*ad*, 1*bd*, 1*cd*, and 1*dd* that are read from the storage medium 13, and outputs the filtered MPEG transport stream 1*e* to the buffer 15 and the PTS·DTS detection unit 18, respectively. Then, the buffer 15 stores this MPEG transport stream.

The ATS detection unit 17 in the respective channel reproduction units extracts an ATS value at the start of reproduction of respective channels in the reproduction MPEG transport streams 1*ad*, 1*bd*, 1*cd*, and 1*dd* that are read from the storage medium 13, and outputs the ATS value to the reproduction ATS generation unit 19*me*. An ATS initial value 19*aa* of the master video channel is outputted from the master video channel reproduction unit 19*ma*, a video channel ATS initial value 19*ba* is outputted from the video channel reproduction unit 19*mb*, a video channel ATS initial value 19*ca* is outputted from the video channel reproduction apparatus 19*mc*, and an audio channel initial value 19*da* is outputted from the audio channel reproduction unit 19*md*, respectively, to the reproduction ATS generation unit 19*me*.

The PTS·DTS detection unit 18 in the respective channel reproduction units detects the values of PTS and DTS and the ATS value of the packet from the filtered MPEG transport stream 1*e*, and outputs the detected values to the reproduction timing generation unit 19*mf*. In this case, the PTS·DTS of the master video channel and the ATS value 19*ab* thereof are outputted from the master video channel reproduction unit 19*ma*, PTS·DTS of a video channel and the ATS value thereof 19*bb* are outputted from the video channel reproduction unit 19*mb*, PTS·DTS of a video channel and the ATS value 19*cb* thereof are outputted from the video channel reproduction unit 19*mc*, and PTS·DTS of the audio channel and the ATS value 19 db thereof are outputted from the audio channel reproduction apparatus 19*md*, respectively, to the reproduction timing generation unit 19*mf*.

The reproduction ATS generation unit 19*me* generates a reproduction ATS value 19*ea* from the master video channel ATS initial value 19*aa*, and outputs a difference between the master video channel ATS initial value 19*aa* and the video channel ATS initial value 19*ba*, a difference between the master video channel ATS initial value 19*aa* and the video channel ATS initial value 19*ca*, a difference between the master video channel ATS initial value 19*aa* and the audio channel ATS initial value 19*da*, respectively, to the reproduction timing generation unit 19*mf*, as an ATS differential information 19*ed*.

Figure 4:
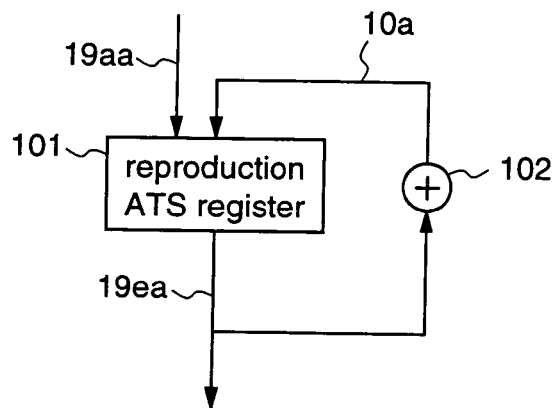
FIG. 4 is a diagram illustrating generation of a reproduction ATS according to the first embodiment.

The way of the reproduction ATS generation unit 19*me* for generating the reproduction ATS value 19*ea* is shown in FIG. 4. At the start of reproduction, the master video channel ATS initial value 19*aa* is set in a reproduction ATS register 101 having the length of 30 bits. The output value of the reproduction ATS register 101 becomes the reproduction ATS value 19*ea*. The reproduction ATS value 19*ea* is inputted to a reproduction ATS counter 102 having the length of 30 bits. The reproduction ATS counter 102 counts up the reproduction ATS value 19*ea* in the cycle of 27 MHz, and sets the updated reproduction ATS value 10*a* in the reproduction ATS register 101. Then, the reproduction ATS generation unit 19*me* outputs the reproduction ATS value 19*ea* and a difference (output interval) 19*ed* of the reproduction ATS values 19*ea* that are allocated to the respective packets.

The reproduction timing generation unit 19*mf* generates rewriting information 19*eb* using the PTS·DTS of the master video channel and the ATS value 19*ab* thereof, the PTS·DTS of the video channel and the ATS value 19*bb* thereof, the PTS·DTS of the video channel and the ATS value 19*cb* thereof, the PTS of the audio channel and the ATS value 19 db thereof, and the ATS difference information 19*ed*. Then, the reproduction timing generation unit 19*mf* outputs the generated rewriting information 19*eb* to the packet rewriting unit 16 in the respective channel reproduction units 19*ma*, 19*mb*, 19*mc*, and 19*md*.

The packet rewriting unit 16 in the respective channel reproduction units rewrites the values of PTS·DTS·PCR of the MPEG transport stream 1*f* that is read from the buffer 15, in accordance with the rewriting information 19*eb*, and outputs respective channel reproductions 19*ac*, 19*ab*, 19*cc*, and 19*dc* to the multiplexing unit 19*mg*, respectively.

The PSI information generation unit 19*mh* generates PSI information of the reproduction MPEG transport stream, and outputs a reproduction PSI packet 19*eh* to the multiplexing unit 19*mg*. The multiplexing unit 19*mg* outputs the reproduction PSI packet when no packet of the video or audio MPEG transport stream is outputted. However, the interval of this packet output satisfies an interval that is defined by ISO/IEC 13818-1.

The multiplexing unit 19*mg* multiplexes the channel reproductions 19*ac*, 19*bc*, 19*cc* and 19*dc* and the PSI information packet 19*eh* in accordance with the reproduction timing information 19*ed* that is incorporated in the channel reproduction 19*ac*, and outputs a reproduction MPEG transport stream 19*ec*.

Figure 5:
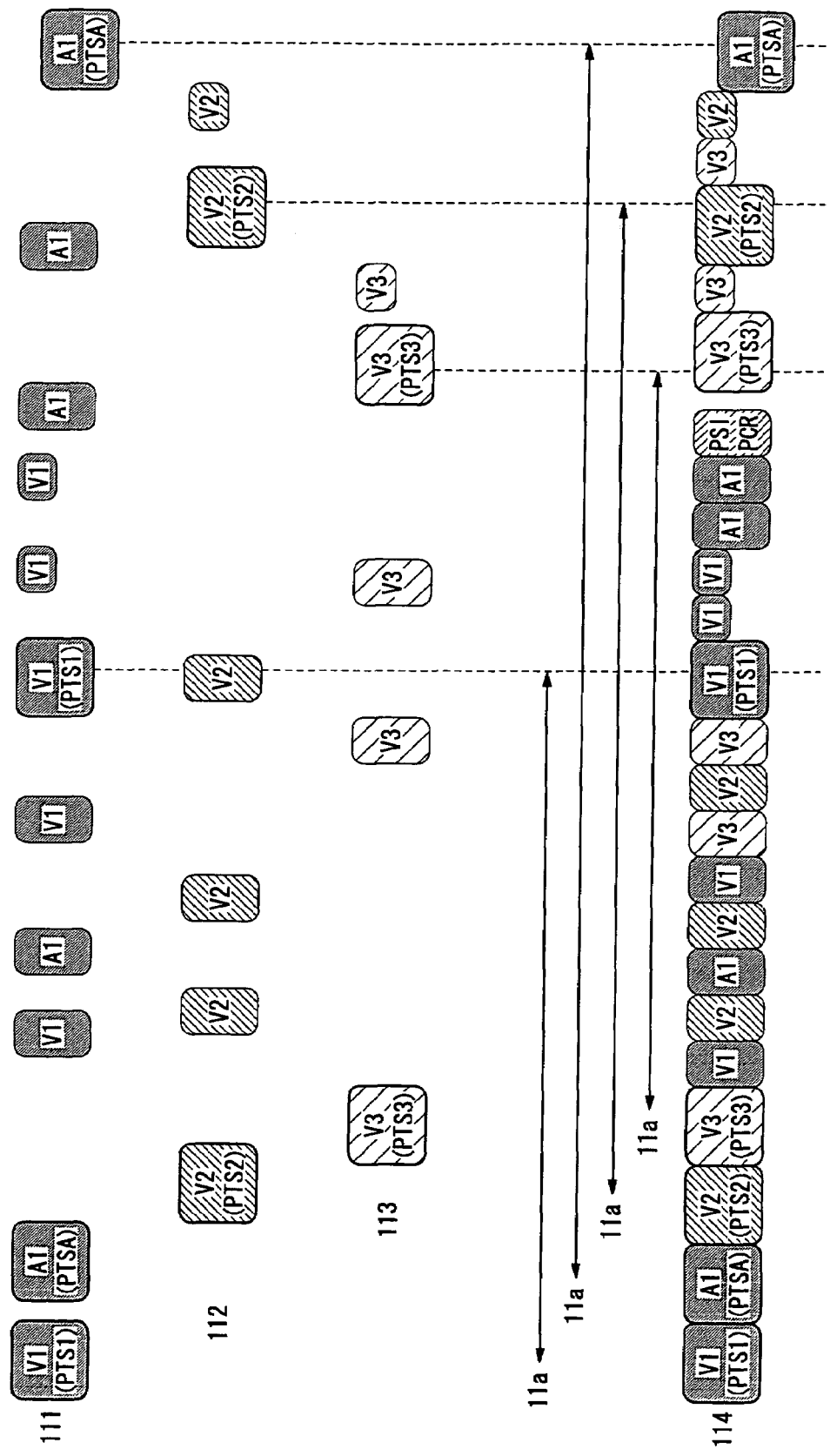
FIG. 5 is a diagram showing reproduction times according to the first embodiment.

FIG. 5 shows output timing of the reproduction MPEG transport stream 19*ec* that is generated by the multiplexing unit 19*mg* at the reproduction of the input MPEG transport streams of the respective channels. Reference numeral 111 denotes reproduction timings of the original images of a reproduction MPEG transport stream which is reproduced by the master video channel reproduction unit 19*ma* and the audio channel reproduction unit 19*md*. Numeral 112 denotes reproduction timings of the original images of a reproduction MPEG transport stream which is reproduced by the video channel reproduction apparatus 19*mb*. Numeral 113 denotes reproduction timings of the original images of a reproduction MPEG transport stream which is reproduced by the video channel reproduction unit 19*mc*. Numeral 114 denotes reproduction times of the reproduction MPEG transport stream.

The reproduction timing generation unit 19*mf* generates reproduction timing information 19*ed* so that the reproduction time interval between PTS and DTS or PTS and PTS of the pre-reproduction MPEG transport stream becomes equal to the reproduction time interval between PTS and DTS or PTS and PTS in the multiplexed MPEG transport stream 19*ec*. That is, the reproduction timing generation unit 19*mf* generates the reproduction timing information 19*ed* so that the reproduction time interval 11*a* between PTS and DTS or PTS and PTS after being subjected to the multiplexing reproduction does not differ from the reproduction time interval between PTS and DTS or PTS and PTS of the original image.

Figure 6:
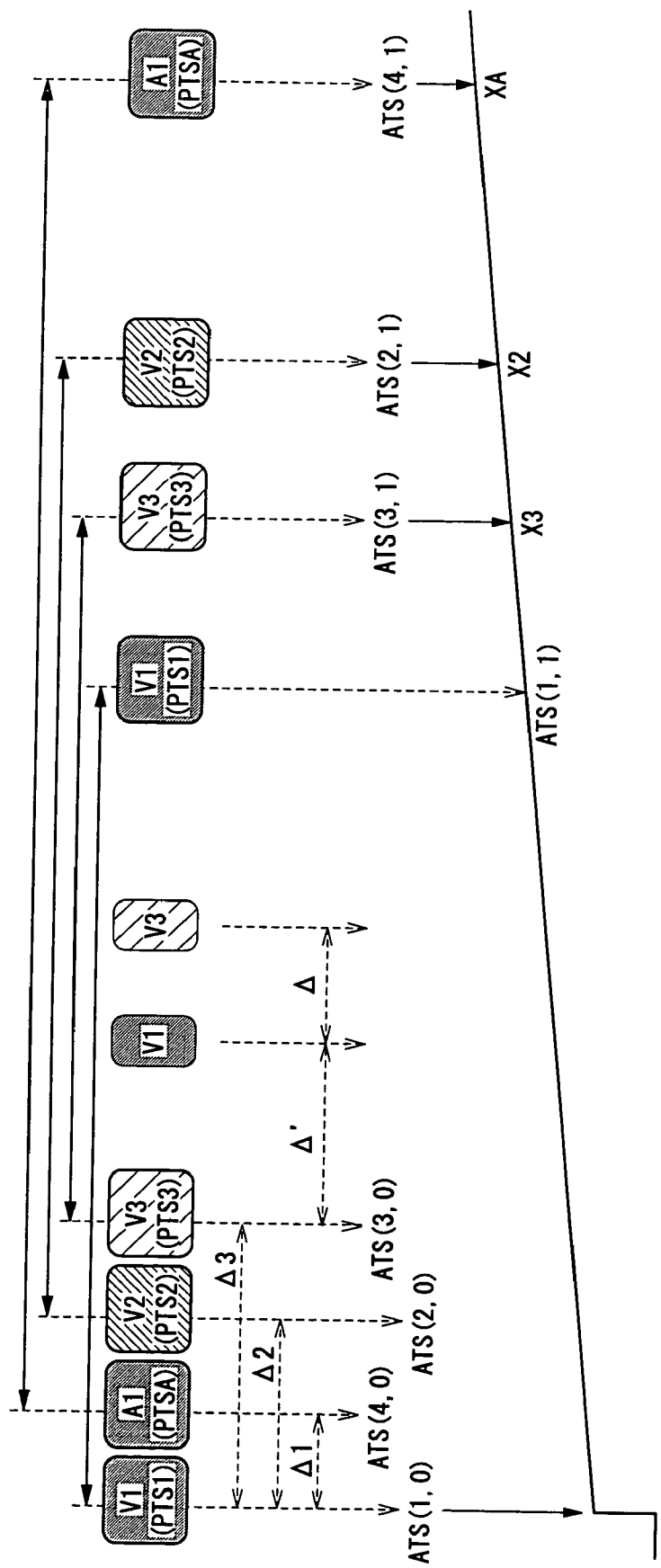
FIG. 6 is a diagram illustrating generation of reproduction timing according to the first embodiment.

FIG. 6 shows generation of the reproduction timing information. The reproduction timing information is generated using the reproduction ATS value 19*ea*. ATS (M,N) indicates an ATS value of a packet including N-th PTS or DTS of the M-th channel. When M=1, the MPEG transport stream is read with the channel reproduction 19*ac*, when M=2, the MPEG transport stream is read with the channel reproduction 19*bc*, when M=3, the MPEG transport stream is read with the channel reproduction 19*cc*, and when M=4, the MPEG transport stream is read by the channel reproduction 19*dc*. It is assumed that a MPEG transport stream packet at the start of reproduction always includes PTS or DTS. The initial value of the reproduction ATS 19*ea* is ATSC(1,0) that is allocated to the master channel, and thereafter the value is increased by the counter of 27 MHz. Then, the first packet in the MPEG transport stream that is allocated to the master channel generates the reproduction timing information 19ed such that the value of the reproduction timing information 19ed becomes ATSC(1,0). Assuming that the output start time of the channel reproduction 19bc is X20, the output start time of the channel reproduction 19cc is X30, and the output start time of the channel reproduction 19dc is X40, the reproduction timing information 19ed that enables to output the respective MPEG transport streams at times given by following formulae is generated.

$$X20 = ATSC(1,0) + D1 \quad \text{Formula 1}$$

$$X30 = ATSC(1,0) + D2 \quad \text{Formula 2}$$

$$X40 = ATSC(1,0) + D3 \quad \text{Formula 3}$$

Here, D1, D2, and D3 are arbitrary values for changing the packet output intervals. The values of D1, D2 and D3 are fixed values.

Further, as for packets that output the N-th PTS or DTS, assuming that the output start time of the channel reproduction 19ac is X10T, the output start time of the channel reproduction 19bc is X20T, the output start time of the channel reproduction 19cc is X30T, and the output start time of the channel reproduction 19dc is X40T, the reproduction timing information 19ed that enables to output the MPEG transport stream in timings that are given by following formulae is generated.

$$X10T = ATSC(1,0) + (ATSC(1,N) - ATSC(1,N-1)) \quad \text{Formula 4}$$

$$X20T = ATSC(1,0) + (ATSC(2,N) - ATSC(2,N-1)) + D1 \quad \text{Formula 5}$$

$$X30T = ATSC(1,0) + (ATSC(3,N) - ATSC(3,N-1)) + D2 \quad \text{Formula 6}$$

$$X40T = ATSC(1,0) + (ATSC(4,N) + ATSC(4,N-1)) + D3 \quad \text{Formula 7}$$

When any of X10T, X20T, X30T and X40T have the same value, a packet that is subjected to audio processing is given higher priority, and the other packet having the same value is shifted backward. In addition, as for packets including no PTS or DTS, the reproduction timing information 19ed is generated so that these packets are arbitrarily outputted without exceeding the order of the MPEG transport stream packet to be reproduced.

Further, the reproduction timing generation unit 19mf also generates the rewriting information 19eb. Here, PTS, DTS, and PCR are rewritten. The reproduction timing generation unit generates the rewriting information 19eb that, assuming that the N-th PTS or DTS original value of the M-th channel is TS(M,N), makes the rewritten PTS or DTS value as XT(M, N), which is given by a following formula:

$$XT(M,N) = TS(M,N) - TS(M,N-1) + ATSC(1,0) + A \text{ (A is an arbitrary fixed value)} \quad \text{Formula 8}$$

Further, the rewriting information 19eb is generated to rewrite PCR to a value that is obtained by converting the reproduction ATS value 19ea so as to conform to the format of the PCR.

On the basis of the rewriting information 19eb, the packet rewriting unit 16 processes the packet 1f that is read from the buffer, and outputs the processed packet as a reproduction MPEG transport stream 19ac.

In the above-mentioned image reproduction apparatus according to the first embodiment, since the PCR value on the same time base is employed in all channels to obtain the reproduction MPEG transport stream 19ec, only one STC counter is used even in the multi-channel decoding, whereby it is possible to perform the decoding more efficiently as compared to the prior art.

In addition, plural PCR counters or plural PCR registers are not required at the reproduction, thereby greatly reducing the size of the circuit.

Further, by utilizing the common PTS and DTS in the respective channels, it is possible to suppress addition of a synchronization process for the decoded video or audio.

Embodiment 2

Figure 20:
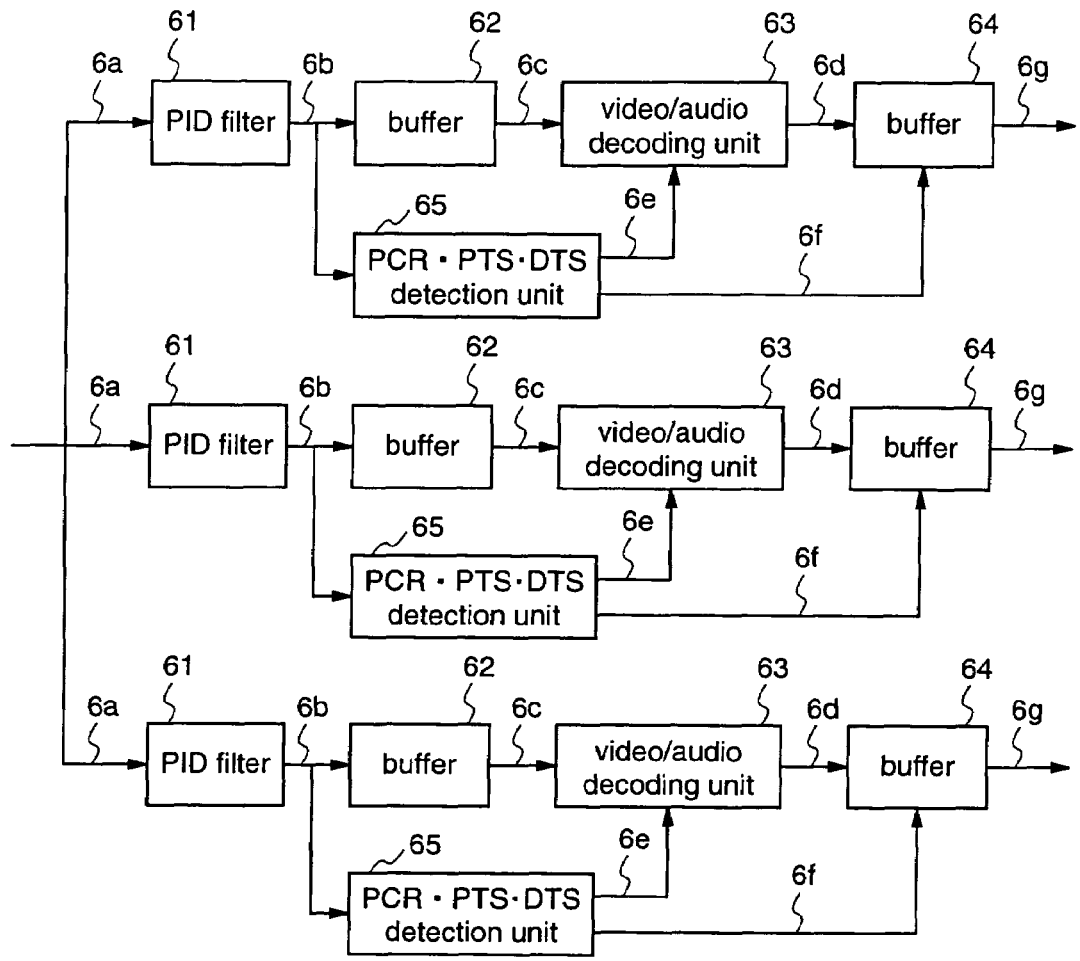
FIG. 20 is a diagram illustrating a structure of a decoding apparatus.
Figure 21:
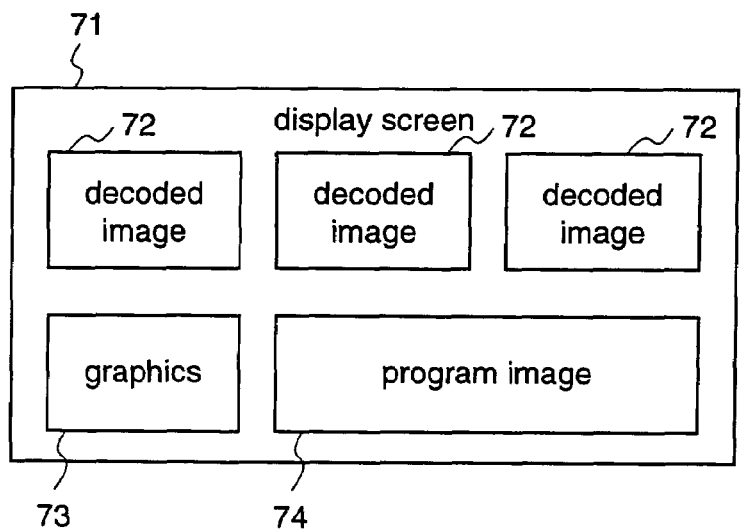
FIG. 21 is a diagram showing a display screen image.
Figure 22:
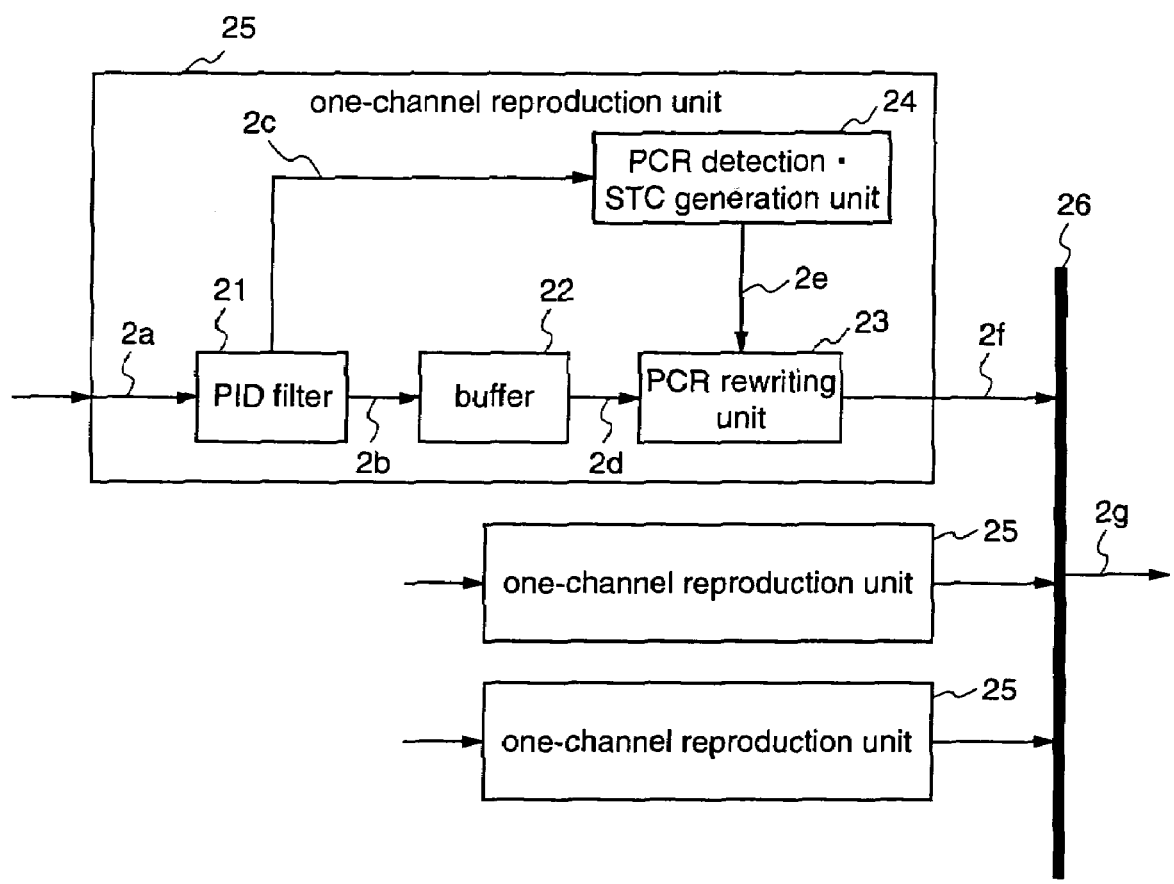
FIG. 22 is a diagram illustrating a prior art image reproduction apparatus.

In the above-mentioned first embodiment, when the reproduction MPEG transport stream 19ec is decoded by the decoding apparatus as shown in FIG. 20, the timing of transferring a packet that includes no PTS or DTS is different from the timing of transferring the original image data. Accordingly, when the reproduction MPEG transport stream 19ec is decoded by the decoding apparatus of FIG. 20, the buffer 62 may underflow or overflow.

Figure 7:
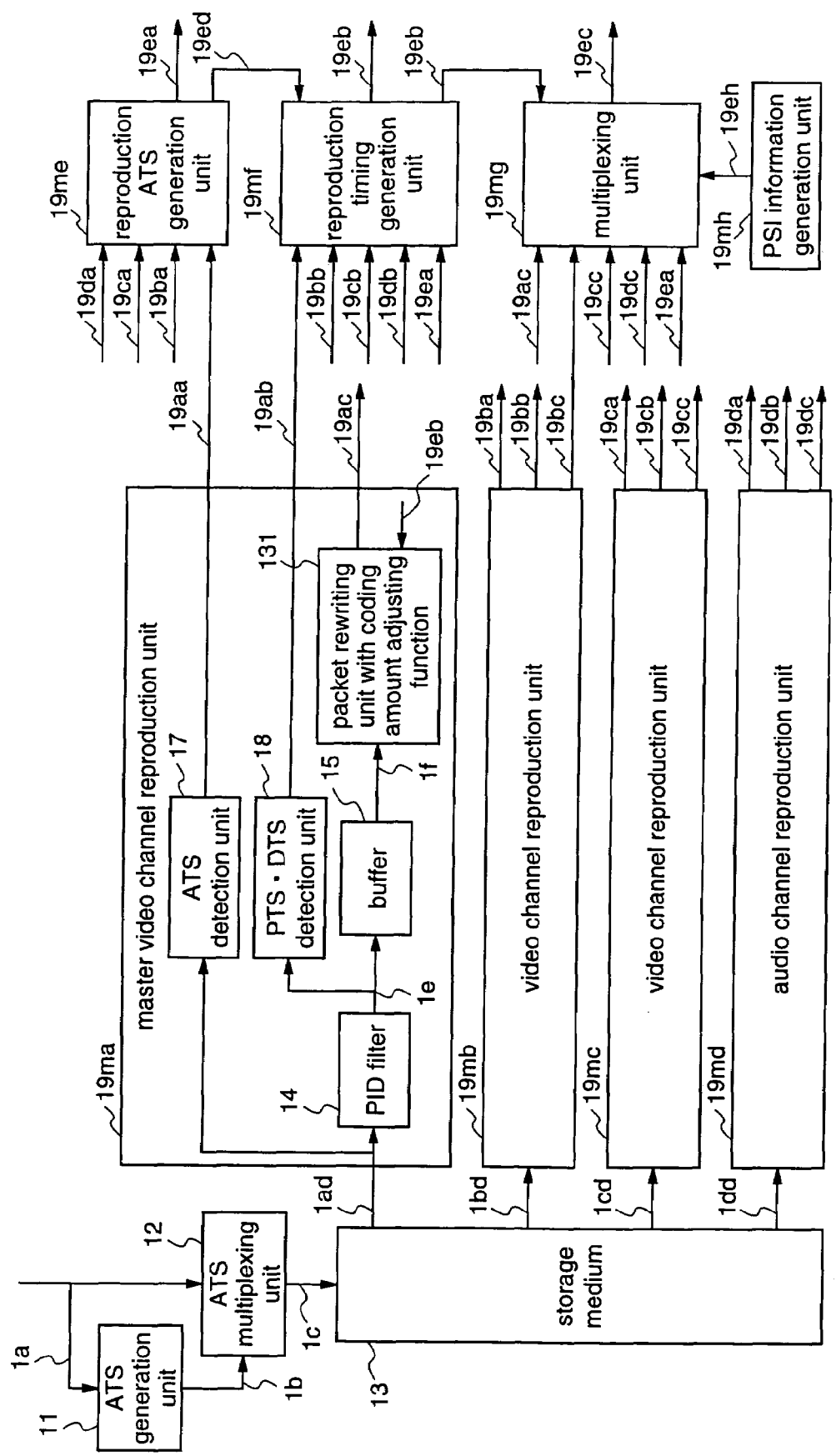
FIG. 7 is a diagram illustrating an image reproduction apparatus according to a second embodiment of the present invention.

FIG. 7 illustrates an image reproduction apparatus according to a second embodiment of the present invention, which solves the above-mentioned problem. In FIG. 7, in the master video channel reproduction unit 19ma, the packet rewriting unit 16 of FIG. 1 is replaced with a packet rewriting unit having a coding amount adjusting function 131.

The packet rewriting unit with the coding amount adjusting function 131 has a function of rewriting a video or audio stream to be reproduced, thereby to control the buffer of the decoding apparatus, as well as the function of the packet rewriting unit 16.

Figure 8:
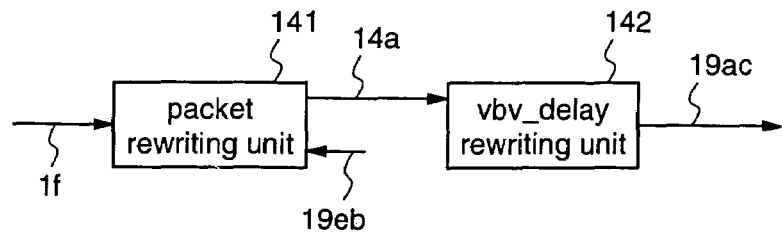
FIG. 8 is a diagram showing a first example of a structure of a packet rewriting unit with coding amount adjusting function according to the second embodiment.

FIG. 8 shows an example of the structure of the packet rewriting unit with the coding amount adjusting function 131. The packet rewriting unit with the coding amount adjusting function 131 rewrites vbv_delay in a MPEG video stream, thereby rewriting the stream.

In FIG. 8, a packet rewriting unit 141 has the same function as the packet rewriting unit 16 of FIG. 1. A packet 14a that is outputted from the packet rewriting unit 141 is inputted to a vbv_delay rewriting unit 142. The vbv_delay rewriting unit 142 rewrites a vbv_delay value in a video stream as 16'hffff, and outputs the channel reproduction 19ac. By rewriting vbv_delay in the video stream, it is possible to prevent underflow or overflow of the buffer 62.

Figure 9:
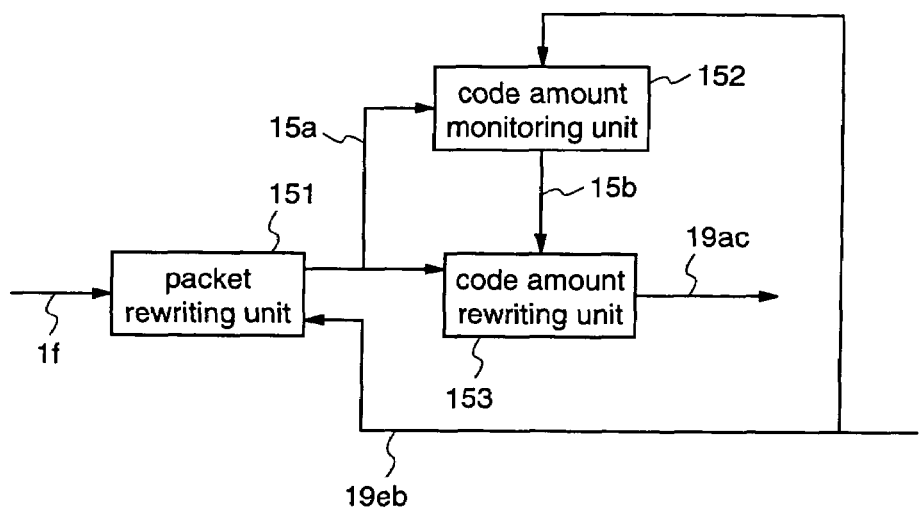
FIG. 9 is a diagram showing a second example of the structure of the packet rewriting unit with coding amount adjusting function according to the second embodiment.

FIG. 9 illustrates a second example of the structure of the packet rewriting unit with the coding amount adjusting function 131. The packet rewriting unit with the coding amount adjusting function 131 in FIG. 9 is provided further with a function of rewriting a coding parameter in a video/audio stream, and monitors the coding amount of the video/audio stream in a MPEG transport stream at the reproduction, to optimize the coding amount.

In FIG. 9, a packet rewriting unit 151 has the same function as the packet rewriting unit 16 of FIG. 1. A packet 15a that is outputted from the packet rewriting unit 151 is inputted to a code amount monitoring unit 152 and a code amount rewriting unit 153. The code amount monitoring unit 152 monitors video/audio codes of the packet output 15a, calculates a parameter for preventing overflow or underflow of the buffer 62 in the decoding apparatus, and outputs the rewriting parameter 15b to the code amount rewriting unit 153. As the rewriting information 19eb is inputted to the code amount monitoring unit 152, it is possible to utilize the values of PTS, DTS, and PCR in generating the rewriting parameter 15b. The code amount rewriting unit 153 rewrites buffer control information such as vbv_delay in accordance with the rewriting parameter 15b, and outputs the channel reproduction 19ac.

In the above-mentioned image reproduction apparatus according to the second embodiment, the actual code amount of video/audio is monitored, and the corresponding parameter in the stream to be rewritten is changed, thereby preventing underflow or overflow of the buffer 62.

FIGS. 8 and 9 show the examples of the structure of the packet rewriting unit 131 in the master video channel reproduction unit 19*ma*, while it goes without saying that the same applies to the video channel reproduction unit 19*mb* and the video channel reproduction unit 19*mc*.

Further, the structure as shown in FIG. 9 may be utilized for the packet rewriting unit 131 in the audio channel reproduction unit 19*md*.

Embodiment 3

Figure 10:
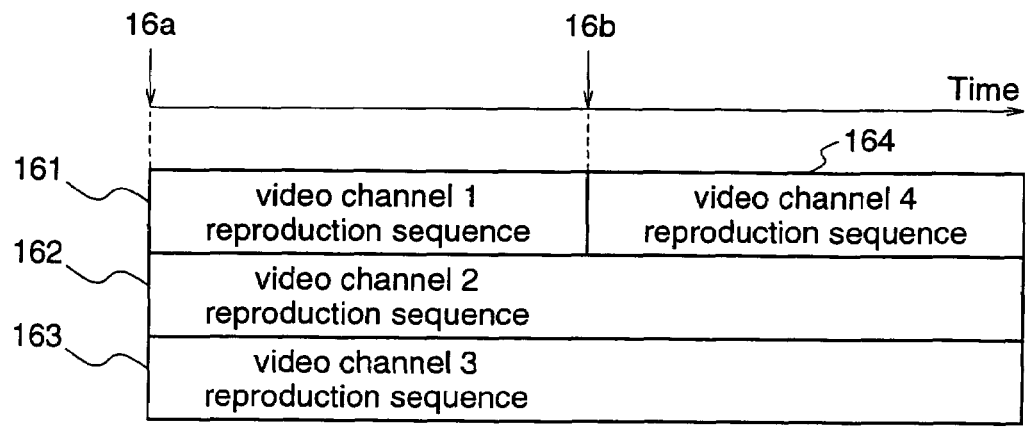
FIG. 10 is a diagram illustrating reproduction sequences of three channels according to a third embodiment of the present invention.

FIG. 10 illustrates reproduction sequences of video streams corresponding to three channels. Reference numeral 161 denotes a reproduction sequence of video channel 1, numeral 162 denotes a reproduction sequence of video channel 2, and numeral 163 denotes a reproduction sequence of video channel 3. Time 16*a* shows a time when reproduction of the reproduction sequences 161, 162, and 163 is simultaneously started. Time 16*b* shows a time when the reproduction sequence 161 of the video channel 1 stops and reproduction of a reproduction sequence 164 of video channel 4 that is different from the video channel 1 is started using the circuit for the video channel 1. That is, this shows that, at the time 16*b*, the reproduction of the video channel 1 stops and the reproduction of the video channel 4 is started while the reproduction sequence 162 of the video channel 2 and the reproduction sequence 163 of the video channel 3 are still being reproduced. Here, the reproduction of the video channel 4 is started from the position of Sequence_header.

In this case, since the ATS value that is added to the last MPEG transport stream of the video channel 1 and the ATS value that is added to the last MPEG transport stream of the video channel 2 are not consecutive, the value of (ATSC(1, N)−ATSC(1,N−1)) in Formula 4 may be abnormally large, whereby the start of the reproduction of the video channel 4 may be greatly delayed. Further, discontinuity in continuity_counter, PTS, DTS, and the coding sequence between the video stream of the video channel 1 and the video stream of the video channel 4 may occur, whereby fluctuations may arise in the images after the time 16*b*.

Figure 11:
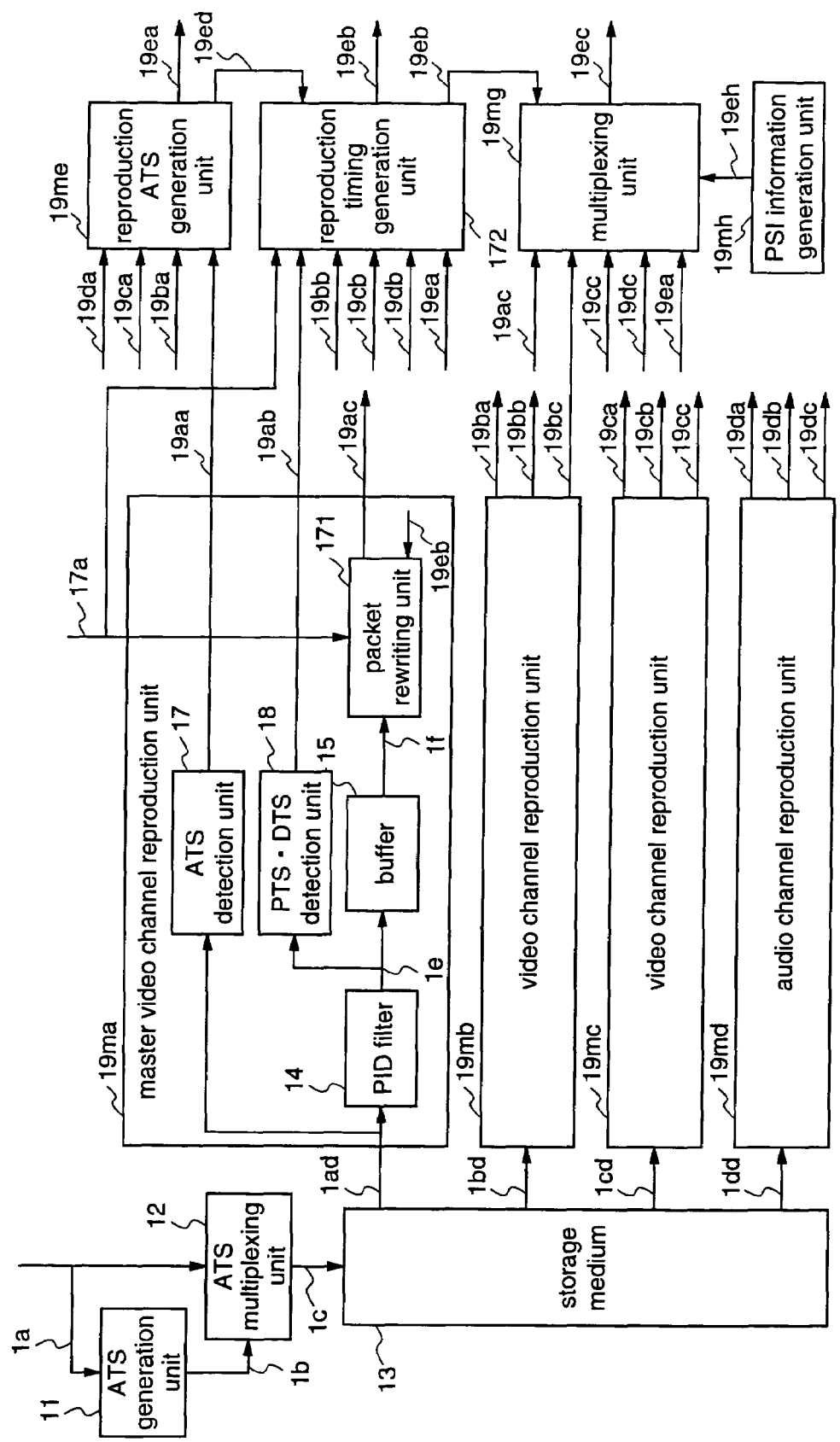
FIG. 11 is a diagram illustrating an image reproduction apparatus according to the third embodiment.

FIG. 11 illustrates an image reproduction apparatus according to a third embodiment of the present invention, which solves the above-mentioned problem.

In FIG. 11, the packet rewriting unit 16 of FIG. 1 is replaced with a packet rewriting unit 171, and the reproduction timing generation unit 19*mf* of FIG. 1 is replaced with a reproduction timing generation unit 172. Further, a reproduction control signal 17*a* is inputted to the packet rewriting unit 171 and the reproduction timing generation unit 172, thereby informing the packet rewriting unit 171 and the reproduction timing generation unit 172 that switching of channels is performed at the time 16*b* in FIG. 10, i.e., at a time of switching the reproduction channels.

The reproduction timing generation unit 172 has the function of the reproduction timing generation unit 19*mf* according to the first embodiment, and further has a function of generating a reproduction time XSB between the last MPEG transport stream of the video channel 1 and the first MPEG transport stream of the video channel 4 and a reproduction time XS4 of the video channel 4 according to Formulae 9 and 10, when the switching of the channels has been performed in accordance with the reproduction control signal 17*a*. Further, the PTS and DTS initial values XR and XR4 are generated by following Formulae 11 and 12.

$$XSB = ATSC(1,0) + (ATSC(1,LAST) - ATSC(1,LAST-1)) + Q \text{ (LAST is the last packet number, Q is an arbitrary fixed value)} \quad \text{Formula 9}$$

$$XS4 = XSB + (ATSC(4,N) - ATSC(4,N-1)) \quad \text{Formula 10}$$

$$XR = XT(1,LAST2) + B \text{ (LAST2 is the last PTS or DTS number, B is an arbitrary fixed value)} \quad \text{Formula 11}$$

$$XR4(N) = TS(4,N) - TS(4,N-1) + XR \quad \text{Formula 12}$$

Accordingly, it is possible to solve the problem that the video is greatly delayed due to the discontinuity in ATS between the channel 1 and the channel 4.

In addition to the function of the packet rewriting unit according to the first embodiment, the packet rewriting unit 171 has a function of correcting the discontinuity in video sequences. The function of correcting the discontinuity in video sequences is equivalent to a function of setting Broken_link bit of a GOP header in the first GOP of the channel 4 at 1, and a function of correcting continuity_counter in the last packet of the channel 1 and continuity_counter in the first packet of the channel 4. The packet rewriting unit 171 enables this function in accordance with the reproduction control signal 17*a*. As the method for correcting continuity_counter, there is for example a method of rewriting all continuity_counter of the channel 4 so as to make contiguous to the continuity_counter of the channel 1, or a method of transmitting a dummy packet before starting the channel 4 to adjust continuity_counter.

With the above-mentioned structure according to the third embodiment, even when the video sequence of channel 1 is switched to the video sequence of channel 4, the reproduction can be performed without causing noises on the screen.

This third embodiment is formed on the basis of the reproduction apparatus according to the first embodiment, while the same applies to the reproduction apparatus according to the second embodiment.

Further, in the third embodiment, the description has been given of the structure of the packet rewriting unit 171 in the master video channel reproduction unit 19*ma*, while it goes without saying that the same applies to the video channel reproduction unit 19*mb* or the video channel reproduction unit 19*mc*.

Embodiment 4

In the above-mentioned third embodiment, when the video channel is switched from channel 1 to channel 4 in the reproduction sequences of the video streams corresponding to three channels as shown in FIG. 10, the PIDs of the video streams included in the reproduction sequence 161 and the reproduction sequence 164 may change. The change in the PID of the video stream is detected by a change in the PSI information. However, as the PSI information, in most cases, only appears in the interval of 100 msec or longer, even when reproduction of the reproduction sequence 164 is started, the decoding apparatus cannot detect PSI for the first 100 msec, and accordingly may not recognize video of channel 4 in the reproduction MPEG transport stream 19*ec*, thereby outputting no picture of the channel 4.

Figure 12:
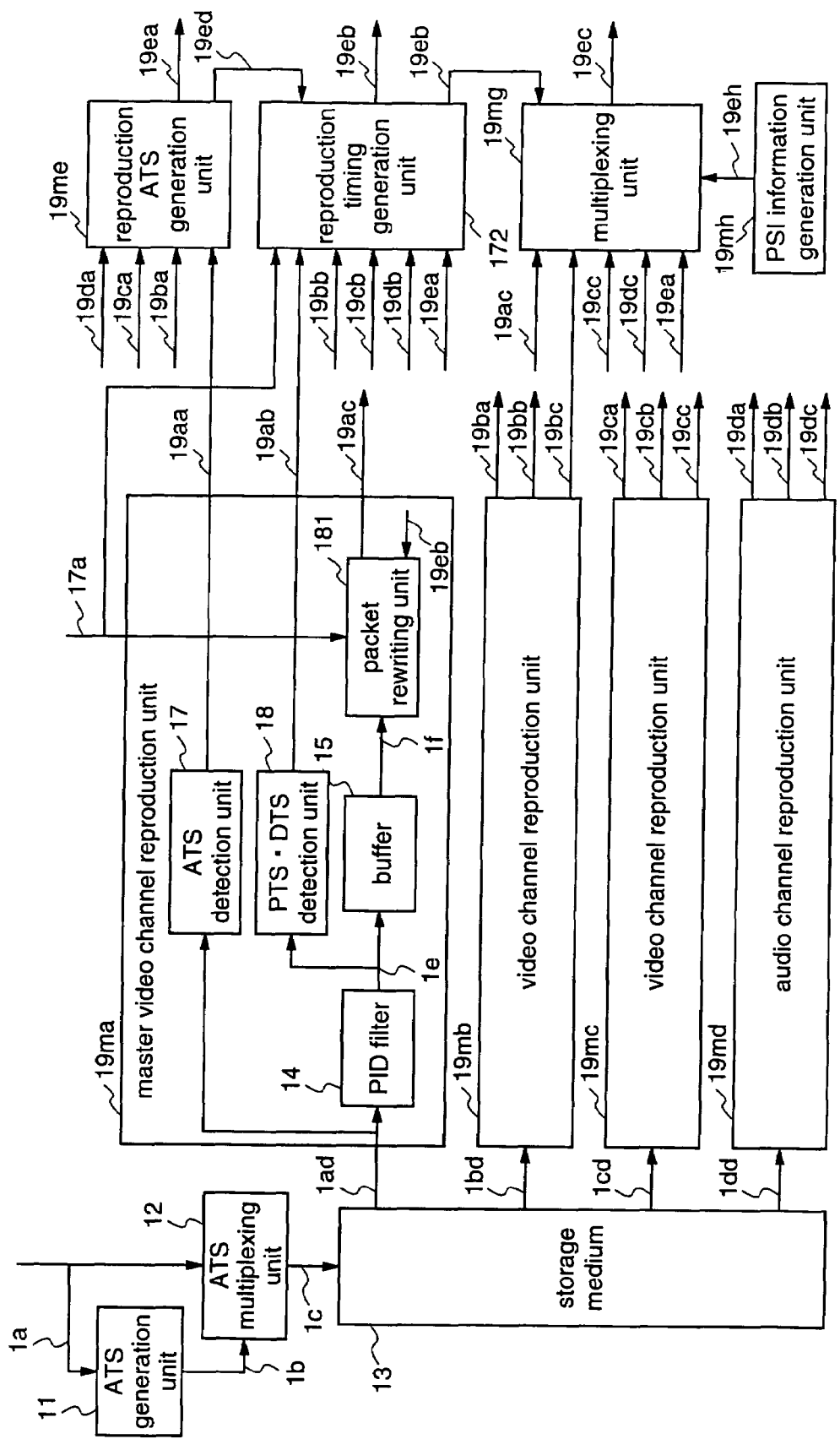
FIG. 12 is a diagram illustrating an image reproduction apparatus according to a fourth embodiment.

FIG. 12 illustrates an image reproduction apparatus according to a fourth embodiment of the present invention, which solves the above-mentioned problem.

In FIG. 12, the packet rewriting unit 171 of FIG. 11 is replaced with a packet rewriting unit 181. In addition to the function of the packet rewriting unit 171 of FIG. 11, the packet rewriting unit 181 has a function of rewriting PID at the switching of channels, thereby preventing video/audio PID from being changed.

The packet rewriting unit 181 changes PID of the MPEG transport stream to PID of the video sequence 161 while the reproduction of the video sequence 164 is being performed. By doing so, the video/audio PID in the reproduction MPEG transport stream is always fixed.

With the structure according to the fourth embodiment, the video/audio PID in the reproduction MPEG transport stream always has a fixed value, whereby there occurs no change in the PSI information, and thus it is possible to solve the problem that part of images or sounds after the channel switching cannot be decoded.

In this fourth embodiment, the description has been given of the structure of the packet rewriting unit 181 in the master video channel reproduction unit 19ma, while it is needless to say that the same applies to the video channel reproduction unit 19mb and the video channel reproduction unit 19mc.

Embodiment 5

Figure 13:
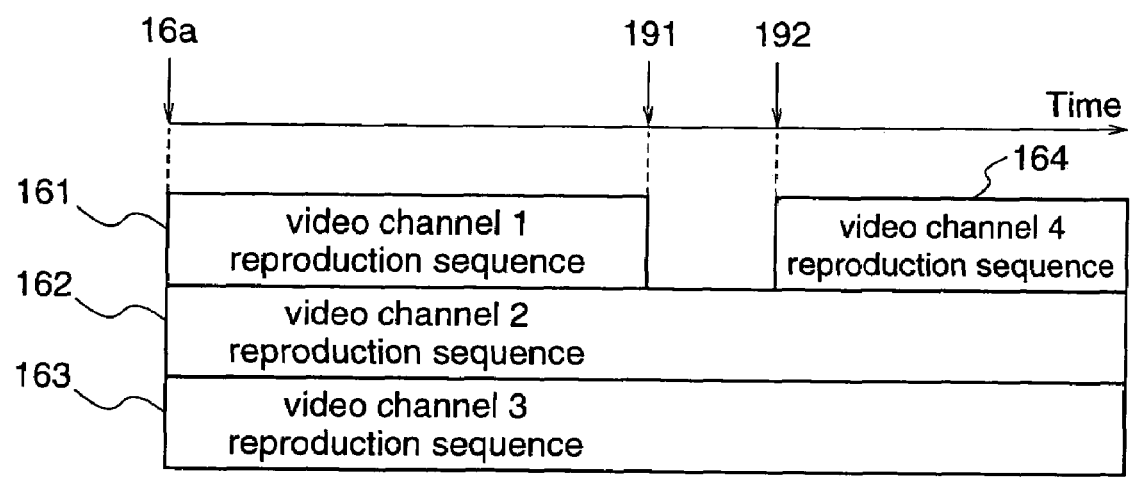
FIG. 13 is a diagram showing reproduction sequences of three channels according to the fourth embodiment.

FIG. 13 illustrates reproduction sequences of video streams corresponding to three channels.

In FIG. 13, time 191 shows a time when the video sequence 161 stops. Other reference numerals show the same as those in FIG. 10. Although the video sequence 161 stops at time 191, the video sequence 164 is not reproduced immediately after the video sequence 161 and the reproduction of the video sequence 164 is started at time 192 as shown in FIG. 10. When the video sequence 161 stops, images which are outputted by the decoding apparatus and displayed on the screen are in any of following states, i.e., the last decoded image is kept on displayed, no image is displayed, or noises occur on the screen.

Figure 14:
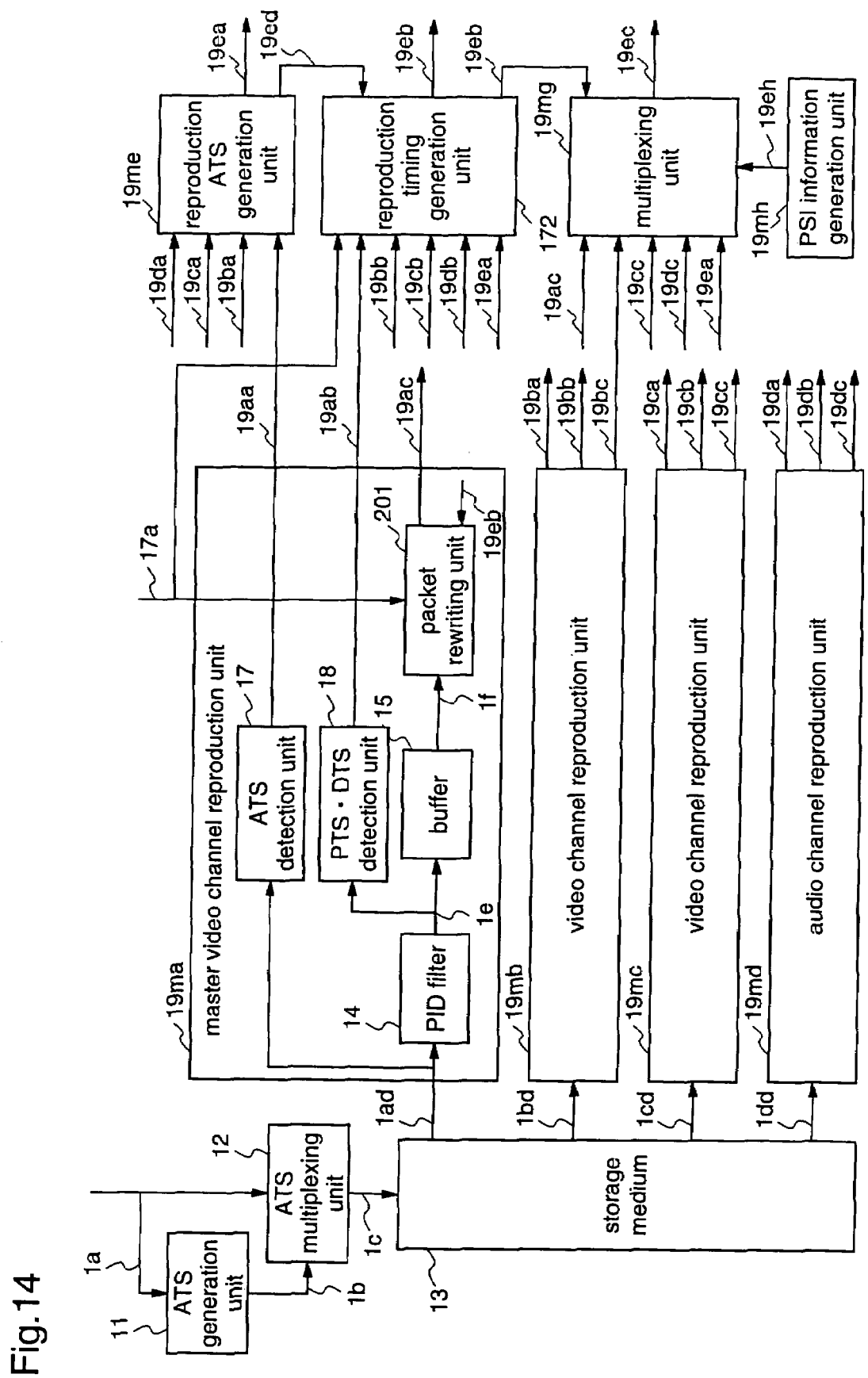
FIG. 14 is a diagram illustrating an image reproduction apparatus according to a fifth embodiment of the present invention.

FIG. 14 illustrates an image reproduction apparatus according to a fifth embodiment of the present invention, which solves the above-mentioned problem.

In FIG. 14, the packet rewriting unit 171 of FIG. 11 is replaced with a packet rewriting unit 201.

The packet rewriting unit 201 has a function of outputting a dummy MPEG transport stream at the switching of channels during a period from when the output of a video stream that is being reproduced stops and to when reproduction of the next stream is started, in addition to the function of the packet rewriting unit 171.

Figure 15:
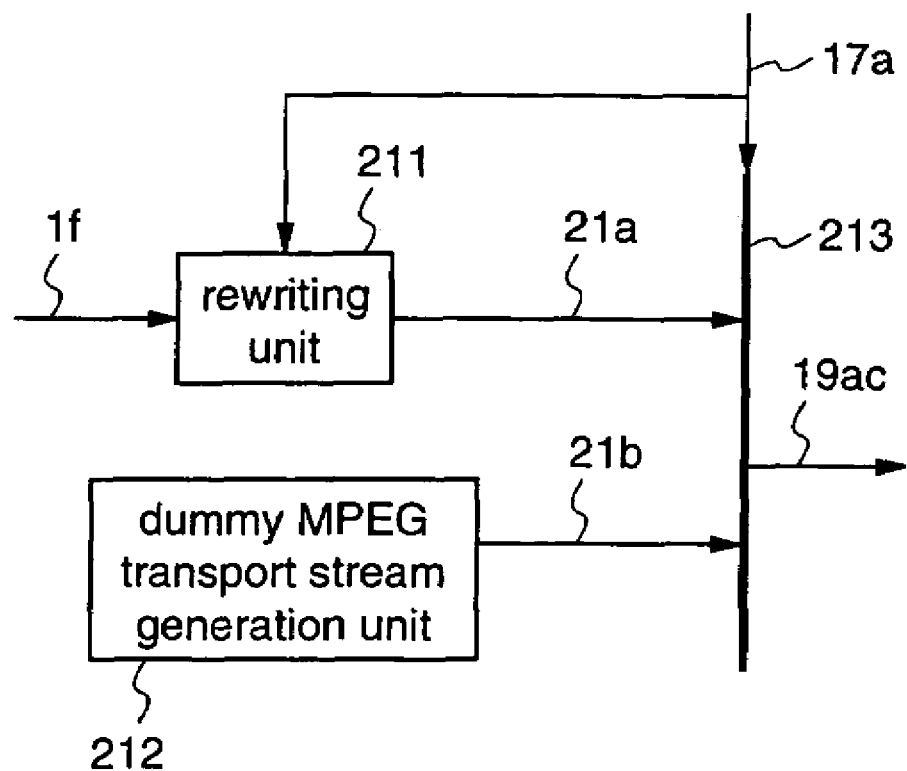
FIG. 15 is a diagram illustrating a structure of a packet rewriting unit according to the fifth embodiment.

FIG. 15 illustrates a structure of the packet rewriting unit 201.

A rewriting unit 211 is the same as the packet rewriting unit 171 in FIG. 11. An output 21a from the rewriting unit 211 is inputted to a selector 213. Before the video sequence 161 stops, the selector 213 selects the output 21a of the rewriting unit 211 with referring to the reproduction control signal 17a, and outputs the channel reproduction 19ac. A dummy MPEG transport stream generation unit 212 outputs a dummy MPEG transport stream 21b to the selector 213 after the video sequence 161 stops and before reproduction of the video sequence 164 is started. The selector 213 selects the dummy MPEG transport stream 21b during a period from time 191 to time 192 shown in FIG. 13 with referring to the reproduction control signal 17a, and outputs the channel reproduction 19ac.

By setting the dummy MPEG transport stream 21b at a lower bit rate, it is possible to reduce the transmission band of the reproduction MPEG transport stream 19ec.

Further, when the dummy MPEG transport stream generation unit 212 generates picture information that is necessary to decode the first picture of the video sequence 164, the video sequence 164 can start from B picture or P picture, although in the third embodiment the video sequence 164 starts only from I picture. For example, when reproducing the video sequence 164 from P picture, it is possible to reproduce the head of the video sequence 164 without noises, by transmitting I picture and P picture in a GOP that includes the first P picture of the video sequence 164 as the dummy MPEG transport stream 21b.

Further, in a case where the video sequence 161 and the video sequence 164 are contents at different times among the same contents, the dummy MPEG transport stream generation unit 212 arbitrarily selects I picture that is located between the video sequence 161 and the video sequence 164 from the storage medium 13, and outputs the selected picture as the dummy MPEG transport stream 21b, whereby the video sequence 161 and the video sequence 164 are connected seamlessly.

Here, it is unnecessary that the dummy MPEG transport stream generation unit 212 should select only I pictures.

Further, in this fifth embodiment, the description has been given of the packet rewriting unit 201 in the master video channel reproduction unit 19ma, while it is needless to say that the same applies to the video channel reproduction unit 19mb and the video channel reproduction unit 19mc.

Embodiment 6

Figure 16:
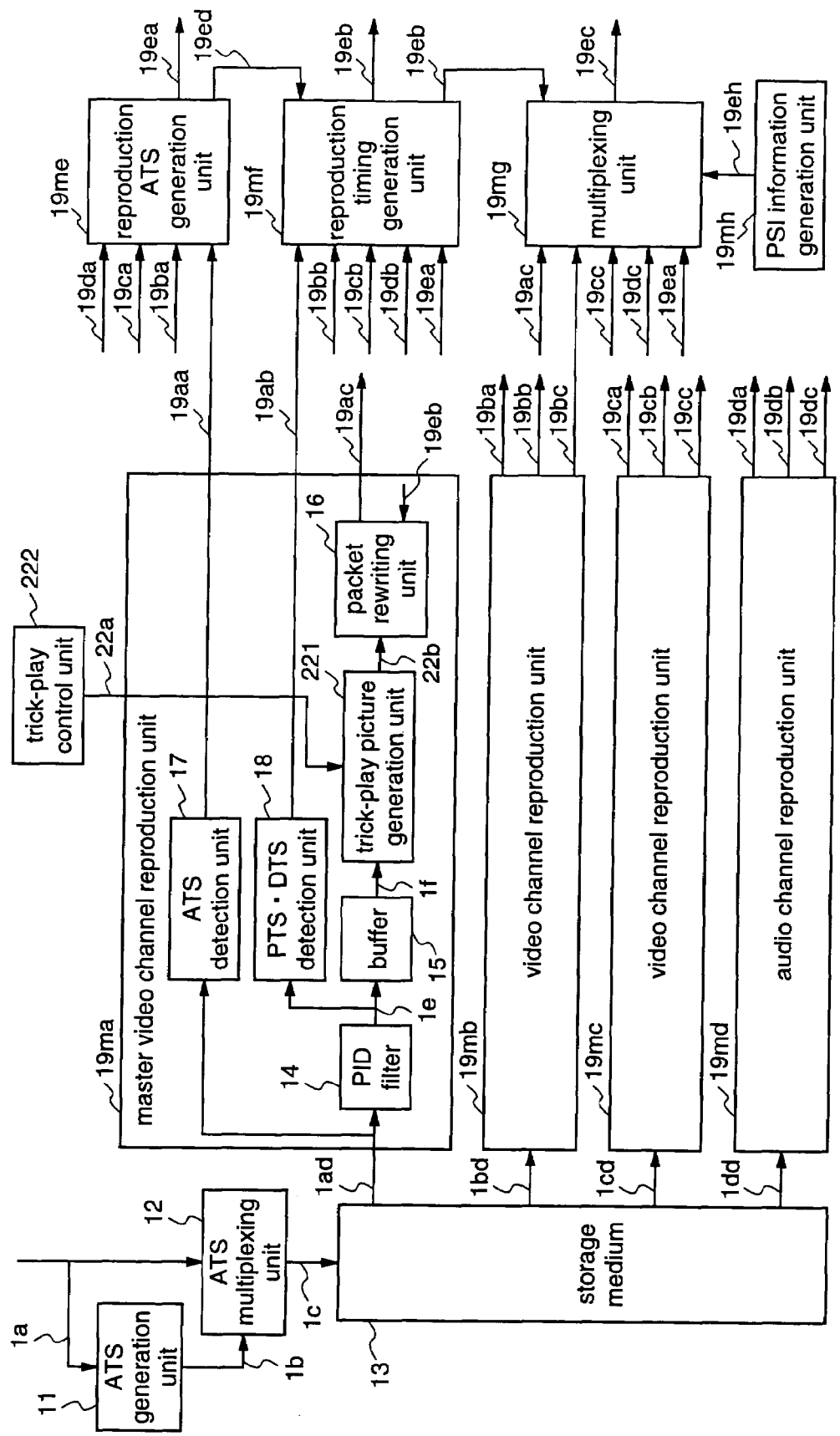
FIG. 16 is a diagram illustrating an image reproduction apparatus according to a sixth embodiment of the present invention.
Figure 17:
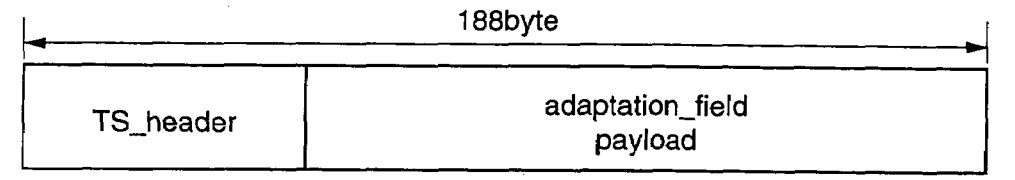
FIG. 17 is a diagram illustrating a structure of a MPEG transport stream.
Figure 17:
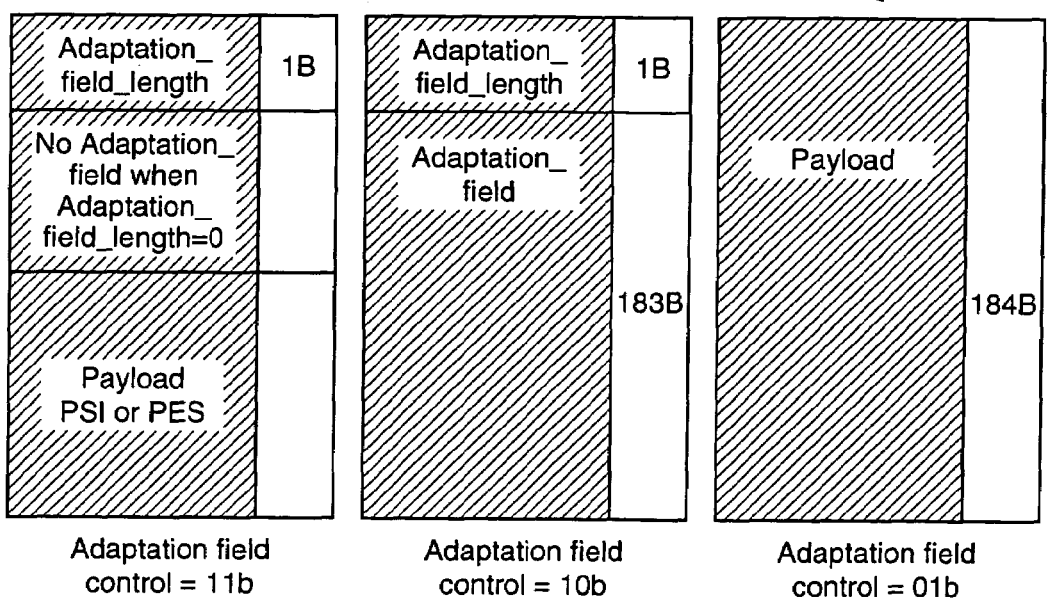
Figure 18:
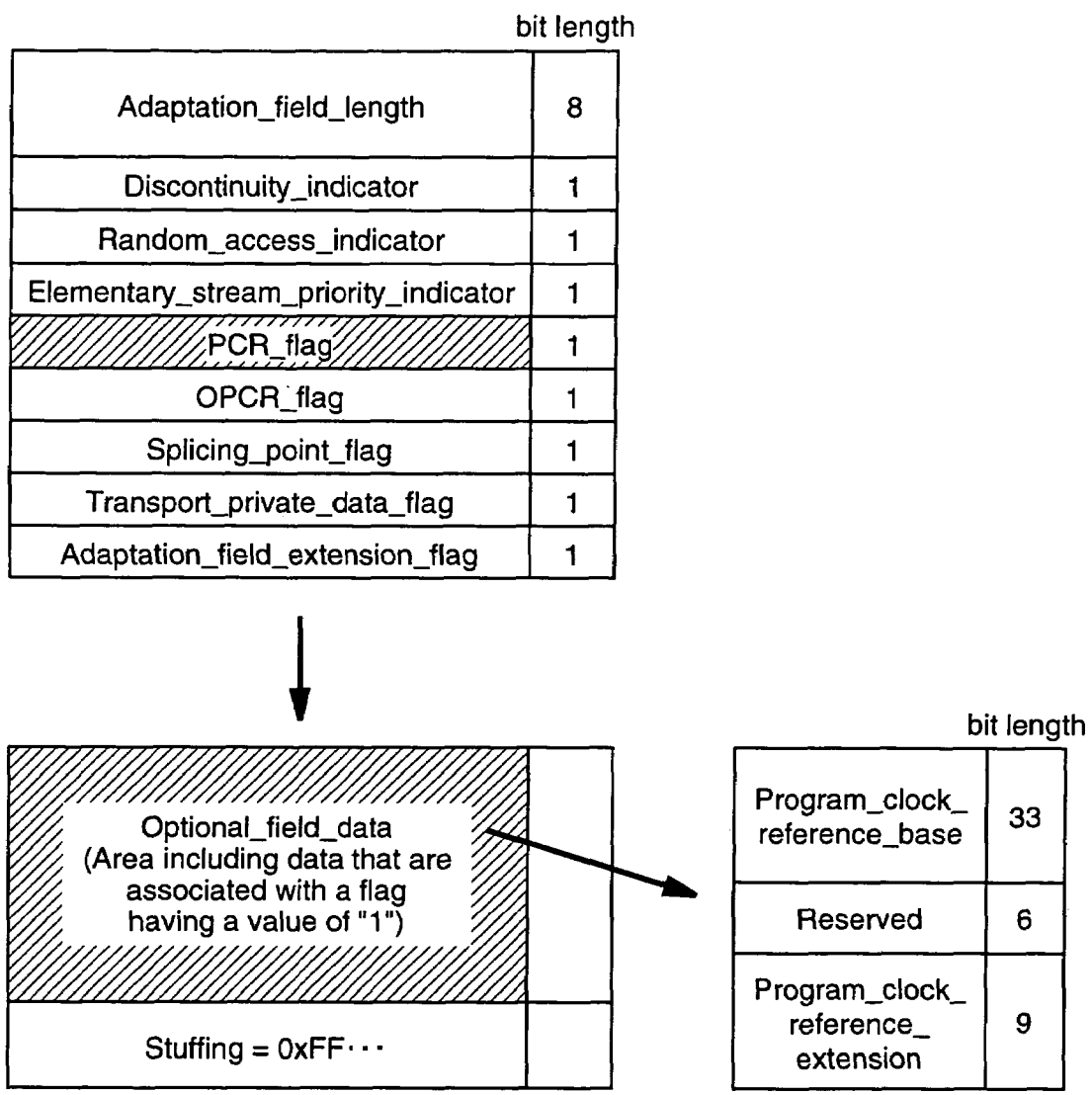
FIG. 18 is a diagram illustrating a structure of adaptation_field.

FIG. 16 illustrates an image reproduction apparatus according to a sixth embodiment of the present invention.

The image reproduction apparatus shown in FIG. 16 has the structure according to the first embodiment, which further includes a trick-play picture generation unit 221 and a trick-play control unit 222.

The trick-play control unit 222 decides the operation speed that is needed for the trick play and the transmission band of a trick-play MPEG transport stream, and transmits a trick-play control signal 22a to the trick-play picture generation unit 221.

At the normal play, the trick-play picture generation unit 221 transmits the MPEG transport stream 1f that is read from the buffer 15 to the packet rewriting unit 16 as it is as an image output 22b. At the trick play, the trick-play picture generation unit 211 reconstructs an image that is needed for the trick play on the basis of the MPEG transport stream 1f that is read from the buffer 15 with referring to the trick-play control signal 22a, and then transmits the reconstructed image to the packet rewriting unit 16 as the image output 22b.

With the structure as shown in FIG. 16, the master video channel reproduction unit 19ma provides a function of generating trick-play pictures.

Further, the trick-play control unit 222 monitors a band in which the reproduction MPEG transport stream 19ec can be transmitted, thereby setting the transmission band that is allocated to the trick-play pictures. When increasing the transmission band, it is possible to generate a trick-play picture of a higher quality. Further, at the trick play, since all timing information can be controlled by the trick-play picture generation unit 211, it is possible to change the transmission band for the trick play at the execution of the trick play. When the number of channels which are simultaneously reproduced becomes smaller, it is possible to increase the transmission band that is allocated to the trick play. On the contrary, when the number of channels which are simultaneously reproduced becomes larger, the transmission band that is allocated to the trick play is reduced.

With the structure according to the sixth embodiment, by increasing or reducing the transmission band, the image quality of the trick play can be changed in realtime.

In this sixth embodiment, the description has been given of the trick-play picture generation unit 211 in the master video channel reproduction unit 19ma, while it goes without saying that the same applies to the video channel reproduction unit 19mb and the video channel reproduction unit 19mc.

Further, the master channel reproduction unit 19ma according to the sixth embodiment can apply to any of the second, third, fourth, and fifth embodiments.

What is claimed is:

1. An image reproduction apparatus including an ATS generation unit, an ATS multiplexing unit, channel reproduction units, a reproduction ATS generation unit, a reproduction timing generation unit, and a multiplexing unit,
wherein an MPEG transport stream is inputted to the ATS generation unit and the ATS multiplexing unit,
wherein the ATS generation unit detects a PCR value in the input MPEG transport stream, and outputs an Arrived Time Stamp (ATS) to the ATS multiplexing unit,
wherein the ATS multiplexing unit multiplexes the ATS and the input MPEG transport stream, and stores the multiplexed MPEG transport stream and ATS in a storage medium,
wherein each of the channel reproduction units includes a PID filter, a buffer, a packet rewriting unit, an ATS detection unit, and a PTS·DTS detection unit,
wherein the PID filter extracts, from the storage medium, an MPEG transport stream having a PID that is to be reproduced, and outputs the extracted MPEG transport stream to the buffer and the PTS·DTS detection unit,
wherein the buffer outputs the extracted MPEG transport stream to the packet rewriting unit in accordance with a control of the multiplexing unit,
wherein the packet rewriting unit rewrites a time that is indicated by an ATS counter and is outputted from the reproduction timing generation unit, as PCR, and outputs the rewritten PCR,
wherein the ATS detection unit reads an initial value of the ATS that is multiplexed with the extracted MPEG transport stream that is extracted from the storage medium, and outputs the initial value of the ATS to the reproduction ATS generation unit as an ATS initial value,
wherein the PTS·DTS detection unit detects PTS and DTS in the extracted MPEG transport stream, and outputs values of the PTS and DTS to the reproduction timing generation unit,
wherein the reproduction ATS generation unit selects one ATS initial value, corresponding to one channel, which is inputted from the ATS detection unit of a channel reproduction unit, and outputs (i) a value of a counter, which uses the selected ATS initial value as an initial value, to the packet rewriting unit, the reproduction timing generation unit, and the multiplexing unit, and (ii) a difference between the selected ATS initial value corresponding to the one channel, which is used as the initial value of the counter, and an ATS initial value of another channel to the reproduction timing generation unit,
wherein the reproduction timing generation unit generates timing of multiplexing of an MPEG transport stream that is outputted from each channel reproduction unit, and outputs the generated timing to the multiplexing unit,
wherein the multiplexing unit multiplexes MPEG transport streams that are outputted from each channel reproduction unit in accordance with the multiplexing timing that is outputted from the reproduction timing generation unit, and outputs the multiplexed stream,
wherein a reproduction control signal for informing switching of video between arbitrary channels is inputted to the packet rewriting unit of each channel reproduction unit and the reproduction timing generation unit, and
wherein the reproduction timing generation unit generates a PTS and a DTS for correcting discontinuity in MPEG video streams resulting from the channel switching in accordance with the reproduction control signal, thereby correcting discontinuity other than that in the PTS and the DTS in the MPEG video streams resulting from the channel switching.

2. The image reproduction apparatus of claim 1 wherein the reproduction timing generation unit generates a timing such that a reproduction time interval between a Presentation Time Stamp (PTS) and a Decoding Time Stamp (DTS) of an arbitrary video/audio channel, which are included in the multiplexed stream outputted from the multiplexing unit, becomes equal to a time interval between a PTS and a DTS in an MPEG transport stream of original images.

3. The image reproduction apparatus of claim 1 wherein the packet rewriting unit further has a function of rewriting a stream, thereby controlling a buffer in a decoding apparatus.

4. The image reproduction apparatus of claim 3 wherein the packet rewriting unit rewrites a stream by rewriting vbv_delay in an MPEG video stream.

5. The image reproduction apparatus of claim 3 wherein the packet rewriting unit further has a function of rewriting a coding parameter of a video/audio stream, and monitors a code amount of a video/audio stream in an MPEG transport stream at the reproduction, thereby optimizing the code amount.

6. The image reproduction apparatus of claim 1 wherein the reproduction timing generation unit generates timing of multiplexing of MPEG transport streams for correcting discontinuity in an Arrived Time Stamp resulting from the channel switching in accordance with the reproduction control signal.

7. The image reproduction apparatus of claim 1 wherein the discontinuity other than that in the PTS and the DTS in the MPEG video streams resulting from the channel switching is discontinuity in Broken_link bits in the MPEG video streams.

8. The image reproduction apparatus of claim 1 wherein the discontinuity other than that in the PTS and the DTS in the MPEG video streams resulting from the channel switching is discontinuity in Continuity_counter bits in the MPEG transport streams.

9. The image reproduction apparatus of claim 1 wherein the packet rewriting unit rewrites a PID so as to prevent a change in a video/audio PID at a time when the channel switching is performed.

10. The image reproduction apparatus of claim 1 wherein the packet rewriting unit outputs a dummy MPEG transport stream at the channel switching during a period from when an output of a video stream that is being reproduced stops and to when reproduction of a next stream is started.

11. The image reproduction apparatus of claim 10 wherein the dummy MPEG transport stream comprises pictures of a low bit rate.

12. The image reproduction apparatus of claim 10 wherein the dummy MPEG transport stream comprises a picture that is required to decode a start picture of the next stream.

13. The image reproduction apparatus of claim 10 wherein when the video stream is switched by the channel switching to a stream of a different time period in the same video stream, the dummy MPEG transport stream comprises arbitrary pictures between a last picture in the video stream that is stopped by the channel switching and a first picture in the video stream that will be reproduced next.

14. The image reproduction apparatus of claim 10,
wherein the dummy MPEG transport stream comprises a picture that is required to decode a start picture of the next stream, or
wherein when the video stream is switched by the channel switching to a stream of a different time period in the same video stream, the dummy MPEG transport stream comprises arbitrary pictures between a last picture of the video stream that is stopped by the channel switching and a first picture of the video stream that will be reproduced next.

15. The image reproduction apparatus of claim 1 further including a trick-play control unit and a trick-play picture generation unit,
wherein the trick-play control unit transmits a transmission band that is allocated to trick play and trick-play control information to the trick-play picture generation unit, and
wherein the trick play picture generation unit generates trick-play video/audio on a basis of outputs from the buffer using the transmission band and the control information which are transmitted from the trick-play control unit, and transmits the generated trick-play video/audio to the packet rewriting unit.

16. The image reproduction apparatus of claim 15,
wherein the trick-play control unit changes the transmission band that is allocated to the trick play also in a period when the trick play is being performed, and
wherein the trick-play picture generation unit generates trick-play pictures on a basis of the transmission band that is transmitted from the trick-play control unit.

17. An image reproduction apparatus including an ATS generation unit, an ATS multiplexing unit, channel reproduction units, a reproduction ATS generation unit, a reproduction timing generation unit, and a multiplexing unit,
wherein an MPEG transport stream is inputted to the ATS generation unit and the ATS multiplexing unit,
wherein the ATS generation unit detects a PCR value in the input MPEG transport stream, and outputs an Arrived Time Stamp (ATS) to the ATS multiplexing unit,
wherein the ATS multiplexing unit multiplexes the ATS and the input MPEG transport stream, and stores the multiplexed MPEG transport stream and ATS in a storage medium,
wherein each of the channel reproduction units includes a PID filter, a buffer, a packet rewriting unit, an ATS detection unit, and a PTS·DTS detection unit,
wherein the PID filter extracts, from the storage medium, an MPEG transport stream having a PID that is to be reproduced, and outputs the extracted MPEG transport stream to the buffer and the PTS·DTS detection unit,
wherein the buffer outputs the extracted MPEG transport stream to the packet rewriting unit in accordance with a control of the multiplexing unit,
wherein the packet rewriting unit rewrites a time that is indicated by an ATS counter and is outputted from the reproduction timing generation unit, as PCR, and outputs the rewritten PCR,
wherein the ATS detection unit reads an initial value of the ATS that is multiplexed with the extracted MPEG transport stream that is extracted from the storage medium, and outputs the initial value of the ATS to the reproduction ATS generation unit as an ATS initial value,
wherein the PTS·DTS detection unit detects PTS and DTS in the extracted MPEG transport stream, and outputs values of the PTS and DTS to the reproduction timing generation unit,
wherein the reproduction ATS generation unit selects one ATS initial value, corresponding to one channel, which is inputted from the ATS detection unit of a channel reproduction unit, and outputs (i) a value of a counter, which uses the selected ATS initial value as an initial value, to the packet rewriting unit, the reproduction timing generation unit, and the multiplexing unit, and (ii) a difference between the selected ATS initial value corresponding to the one channel, which is used as the initial value of the counter, and an ATS initial value of another channel to the reproduction timing generation unit,
wherein the reproduction timing generation unit generates timing of multiplexing of an MPEG transport stream that is outputted from each channel reproduction unit, and outputs the generated timing to the multiplexing unit,
wherein the multiplexing unit multiplexes MPEG transport streams that are outputted from each channel reproduction unit in accordance with the multiplexing timing that is outputted from the reproduction timing generation unit, and outputs the multiplexed stream,
wherein a reproduction control signal for informing switching of video between arbitrary channels is inputted to the packet rewriting unit of each channel reproduction unit and the reproduction timing generation unit, and
wherein the reproduction timing generation unit has a function of generating a PTS and a DTS for correcting discontinuity in MPEG video streams resulting from the channel switching in accordance with the reproduction control signal, thereby correcting discontinuity other than that in the PTS and the DTS in the MPEG video streams resulting from the channel switching, and a function of generating timing of multiplexing of MPEG transport streams for correcting discontinuity in Arrived Time Stamps resulting from the channel switching in accordance with the reproduction control signal.

18. The image reproduction apparatus of claim 17 wherein the discontinuity other than that in the PTS and the DTS in the MPEG video streams resulting from the channel switching is discontinuity in Broken_link bits in the MPEG video streams.

19. The image reproduction apparatus of claim 17 wherein the discontinuity other than that in the PTS and the DTS in the MPEG video streams resulting from the channel switching is discontinuity in Continuity_counter bits in the MPEG transport streams.

20. The image reproduction apparatus of claim 17 wherein the packet rewriting unit rewrites a PID so as to prevent a change in a video/audio PID at a time when the channel switching is performed.

21. The image reproduction apparatus of claim 17 wherein the packet rewriting unit outputs a dummy MPEG transport stream at the channel switching during a period from when an output of a video stream that is being reproduced stops and to when reproduction of a next stream is started.

* * * * *